(12) United States Patent
Dixon et al.

(10) Patent No.: US 7,205,898 B2
(45) Date of Patent: Apr. 17, 2007

(54) RFID TAGS

(76) Inventors: Paul F. Dixon, 68 Holland Rd., Wakefield, MA (US) 01880; Michael P. Carpenter, 13 Robert Rd., Acton, MA (US) 01720; Mary M. Osward, 20 Woodland Rd., Holbrook, MA (US) 02343; David A. Gibbs, 74 Homestead St., Waban, MA (US) 02468

( * ) Notice: Subject to any disclaimer, the term of this patent is extended or adjusted under 35 U.S.C. 154(b) by 61 days.

(21) Appl. No.: 11/239,996

(22) Filed: Sep. 30, 2005

(65) Prior Publication Data

US 2006/0109124 A1 May 25, 2006

Related U.S. Application Data

(60) Provisional application No. 60/615,826, filed on Oct. 4, 2004, provisional application No. 60/713,861, filed on Sep. 2, 2005.

(51) Int. Cl.
*G08B 13/14* (2006.01)
(52) U.S. Cl. .................................. 340/572.1; 340/571
(58) Field of Classification Search ............. 340/572.1
See application file for complete search history.

(56) References Cited

U.S. PATENT DOCUMENTS

| 5,257,009 | A | * | 10/1993 | Narlow ..................... 340/572.3 |
| 6,329,915 | B1 | | 12/2001 | Brady et al. ............. 340/572.1 |
| 7,158,033 | B2 | * | 1/2007 | Forster .................... 340/572.1 |
| 2005/0140512 | A1 | * | 6/2005 | Sakama et al. .......... 340/572.7 |

* cited by examiner

*Primary Examiner*—Daniel Wu
*Assistant Examiner*—George A. Bugg
(74) *Attorney, Agent, or Firm*—Nields & Lemack

(57) ABSTRACT

A system and method for the use of ultra high frequency RFID tags in conjunction with metal substrates, as well as substrates used to contain liquid. Briefly, an RFID isolator comprised of a material with complex magnetic permeability, used either by itself, or in combination with dielectric isolator material, is interposed between the RFID tag and the substrate. Alternatively, a material possessing at least two distinct dielectric constants is interposed between the RFID tag and the substrate, such that there is a high dielectric constant at the interface with the substrate, and a low dielectric constant at the interface with the RFID tag. This material can be a single material having a dielectric constant gradient, or alternatively, two or more separate layers, each with a uniform but different dielectric constant, sandwiched together.

72 Claims, 7 Drawing Sheets

SYMBOL X1060

Applied Wireless Identifications APL-1216

RFID TAGS

This application claims priority of U.S. Provisional Application Ser. No. 60/615,826, filed Oct. 4, 2004, and U.S. Provisional Application Ser. No. 60/713,861, filed Sep. 2, 2005, the disclosures of which are incorporated herein by reference.

BACKGROUND OF THE INVENTION

Radio Frequency Identifier (RFID) tags are used in a variety of applications, such as inventory control and security. Unlike barcode tracking systems, the advantage of these more intelligent RFID systems is that an RFID system can store specific information about an article and can read that information on a tag without requiring line of sight or a particular orientation. This means that RFID systems can be largely automated, reducing the need for manual scanning.

These RFID tags are typically placed on or in articles, or containers such as cardboard boxes. The RFID tags work in conjunction with an RFID base station. The base station supplies an electromagnetic wave output, which acts as the carrier frequency. Data are then used to modulate the carrier frequency to transmit specific information. RFID systems typically operate at either a low frequency range (generally less than 100 MHz), or a higher frequency range (greater than 100 MHz). In many applications, one such higher frequency range is between 800 and 1000 MHz (defined as the UHF Band), with 915 MHz being the most common high frequency currently utilized in the United States. Most RFID systems utilize frequency hopping centered around this frequency, such that the overall frequency range is approximately 902 to 928 MHz. A second high frequency used by RFID tags in the United States is 2450 MHz. Currently, European standards utilize 869 MHz and the Japanese standard is 953 MHz.

Many RFID tags contain integrated circuits, which are capable of storing information. Depending on the specific implementation of the RFID tag, the integrated circuit may be capable of replacing stored information with new information at a later time. When the base station requests data, the integrated circuit supplies the information that it has stored in response to that request. In those RFID tags that permit information to be rewritten, the integrated circuit overwrites its existing information when new data are received from the base station.

In addition to the integrated circuit, the RFID tags contain an antenna. The antenna is needed to receive the electromagnetic waves generated by the base station, and to transmit data via the same frequency. The configuration of the antenna can vary, and includes flat coils, patches, microstrip antennas, stripline antennas and dipoles.

Some of these RFID tags are self-powered, that is, they contain an internal power supply such as a battery. Other RFID tags are field-powered. These latter tags use incident RF energy transmitted by the base station to supply their required voltage. The RF energy is received by the tag antenna as an AC signal, which is then rectified to form a DC voltage, which is used to power the integrated circuit.

These integrated circuits have a minimum voltage requirement below which they cannot function and the tag cannot be read. The rectified DC voltage is a function of the signal strength of the received electromagnetic wave. For example, a RFID tag that is proximate to the base station will receive more energy and therefore be able to supply sufficient voltage to its integrated circuit, as contrasted to a RFID tag which is physically farther away from the base station. The maximum distance between the base station and the RFID tag at which the RFID tag can still be read is known as the read distance. Obviously, greater read distances are beneficial to nearly all RFID applications.

One benefit of RFID tags that operate in the high frequency range is the potential to have much greater read distances than tags operating at low frequency. RFID tags utilizing the 915 MHz frequency range typically possess a read distance in excess of 10 feet in free air. In contrast, lower frequency (such as 13.56 MHz, which is part of the HF Band) tags rarely achieve read distances greater than 2 feet.

One reason for this difference is due to the difference in the energy transfer mechanisms at the HF and UHF frequencies. As described above, it is the electric field of the propagating signal that gives rise to a potential difference across the antenna at UHF frequencies. In contrast, passive RFID tag systems operating in the HF frequency band at 13.56 MHz employ magnetic induction to couple the transponder tag and the reader. The power required to energize and activate the HF tag microchip is drawn from the oscillatory magnetic field created by the reader.

Unfortunately, high frequency RFID tags cannot be read when the tag is in close proximity to a metal substrate or a substrate with high water content. Thus, an RFID tag attached to a metal container or to a bottle containing a soft drink cannot be read, from any distance.

Experimentation in the industry has shown that such RFID tags are once again readable if there is a substantial air gap interposed between the tag and the article substrate. This required air gap is typically at least one quarter of an inch or greater. Various designs have been developed to allow tags to "stand off" from the article substrate in order to create this gap. However, standoff tags are impractical in the majority of commercial applications. The distance between the tag and the article increases the likelihood of the tag being dislodged or damaged in normal use.

Recognizing that an air gap acts as a dielectric insulator, tag manufacturers have attempted to solve the stand off problem by interposing a thin layer of a dielectric insulating material of dielectric constant, k, between the tag and the article substrate. U.S. Pat. No. 6,329,915 discloses the use of a homogeneous material of high dielectric constant to address this issue. However, homogeneous materials with various k values have been tried with little or no success.

Therefore, a system and method for allowing the use of RFID tags on these substrates would represent a significant advance for the use of high frequency RFID tags.

SUMMARY OF THE INVENTION

The present invention overcomes the shortcomings of the prior art. Specifically, the present invention provides a system and method for the use of high frequency RFID tags in conjunction with substrates, particularly metal substrates, as well as substrates used to contain liquid. Briefly, an RFID isolator comprised of a material with complex magnetic permeability, used either by itself, or in combination with dielectric isolator material, is interposed between the RFID tag and the substrate. Alternatively, a material possessing at least two distinct dielectric constants is interposed between the RFID tag and the substrate, such that there is a high dielectric constant at the interface with the substrate, and a low dielectric constant at the interface with the RFID tag. This material can be a single material having a dielectric constant gradient, or alternatively, two or more separate layers, each with a uniform but different dielectric constant, sandwiched together, This material overcomes the inability of many tags to be read on metal substrates using prior art dielectric isolators. In other cases, this material improves the read distance of tags that have limited read distances with prior art dielectric isolators.

DETAILED DESCRIPTION OF THE INVENTION

Passive UHF RFID tag antennas are optimized for use in free space or on low dielectric materials, such as corrugated cardboard, pallet wood, etc. When a UHF RFID tag is in proximity to a metallic substrate, the impedance of the tag antenna changes. For efficient power transmission of the wave transmitted by the RFID reader to the IC circuitry of the tag, the antenna must provide a smooth impedance transformation from free space to the impedance of the IC circuitry. Antenna design usually assumes that the substrate with which the antenna will be in close proximity has a magnetic permeability equal to unity. In substrates with a magnetic permeability not equal to unity, a parasitic inductance in an isolator material can be used to offset the parasitic capacitance of the metal substrate, thereby benefiting tag isolation. Alternatively, material of at least two distinct dielectric constants can be used to better isolate the tag from the metal substrate.

Figure 6:
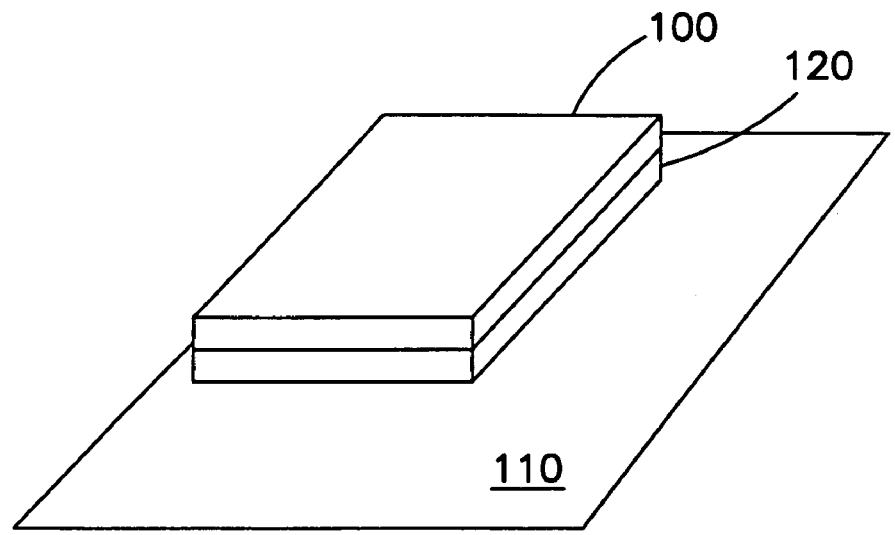
FIG. 6 shows a first embodiment of the present invention.

FIG. 6 shows a first embodiment of the present invention. RFID tag 100 can be specially designed, or purchased from any of a number of companies, such as Intermec Technologies Corporation, Symbol Technologies (formerly Matrics Inc.), Alien Technology, Philips Semiconductor, and Texas Instruments. In the preferred embodiment, the RFID tag operates in the frequency range between 800 and 1000 MHz, with the most preferably center frequencies being 869 MHz, 915 MHz and 953 MHz. This RFID tag can be self-powered by inclusion of a power source, such as a battery. Alternatively, it can be field-powered, such that it generates its internal power by capturing the energy of the electromagnetic waves being transmitted by the base station and converting that energy into a DC voltage.

Article 110 is the object to be tagged. As described above, articles comprising a metal substrate, or configured to contain liquid are problematic, with respect to read distances. In various testing, a tag could not be read when attached to a metal substrate. Recognizing that there is an interaction between the RFID tag 100 and the metal substrate, several designs have incorporated standoffs so as to introduce a layer of air between the two components. While this improves the read distance of the RFID tag, it is commercially impractical due to the likelihood of the RFID tag being dislodged or damaged. To simulate the effect of an air gap, several manufactures have interposed a thin layer of material 120 with a high dielectric constant. Unfortunately, the inclusion of a material with a high dielectric constant, so as to insulate the tag from the metal, has shown little or no success.

Unexpectedly, favorable results were achieved by the present inventors when the article 110 and the RFID tag 100 were separated by a material 120 possessing a dielectric constant gradient, such that the dielectric constant at the interface between the material and the article 110 was higher than the dielectric constant at the interface between the material and the RFID tag 100. This gradient was ineffective, however, when the high dielectric constant was facing the RFID tag 100. The material 120 may have one or both surfaces in contact with an adhesive, such as 3M Company silicone/acrylic double coated film tale 9731, to facilitate adhering the material 120 to the RFID tag 100 and the article 110.

Generally, the material 120 used can be an elastomer, a plastic or a ceramic. The material includes a low loss dielectric filler, such as titanium dioxide, boron nitride, silicon dioxide, aluminosilicates, magnesium oxide, or aluminum oxides, to achieve the desired dielectric constant. In the preferred embodiment, the material 120 is a silicone elastomer polymer. Titanium dioxide is used to modify the dielectric constant of the polymer. By mixing in titanium dioxide in a non-uniform manner, it is possible to create a material having a high dielectric constant on one surface and a lower dielectric constant on the opposite surface. Another method that can be used to generate the dielectric gradient is to vibrate the mixture. Typically, the titanium dioxide has a greater density than the base material. Therefore, by vibrating the mixture, the titanium dioxide will tend to settle toward the bottom of the mixture, thereby creating a non-uniform distribution of the dielectric filler. In this example, the dielectric constant near the bottom will be higher than that at the top. Gradients produced within a single layer are not limited to this embodiment. Gradients may be a linear, logarithmic, exponential or other non-linear function.

Figure 7:
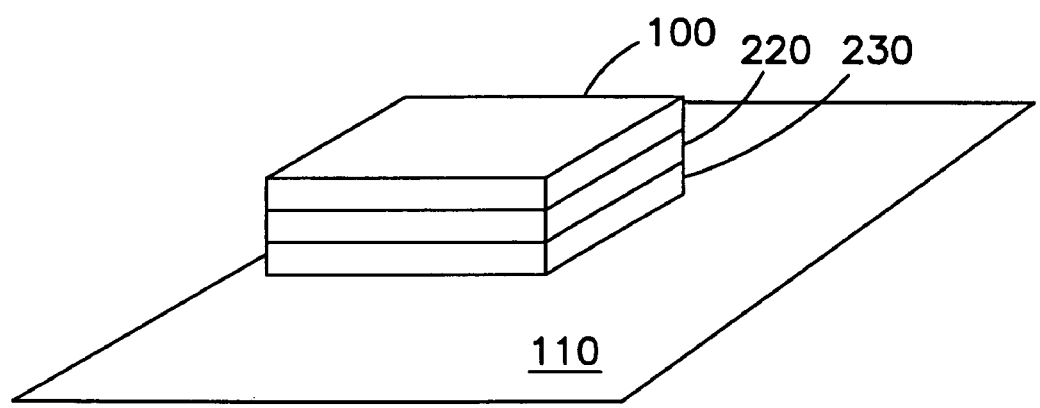
FIG. 7 shows a second embodiment of the present invention.

FIG. 7 shows an alternative embodiment of the present invention. The dielectric gradient material was fabricated by sandwiching two layers of varying thickness, one of low dielectric constant and one of high dielectric constant. Top layer 220 and bottom layer 230 are placed in contact with each other, and are interposed between RFID tag 100 and article 110, such that the top surface of top layer 220 is in contact with RFID tag 100 and the opposite surface of top layer 220 is in contact with bottom layer 230. Similarly, the top surface of bottom layer 230 is in contact with layer 220 and the opposite layer of bottom layer 230 is in contact with article 110. The dielectric constant of top layer 220 is relatively low, preferably less than or equal to 4.0, while the dielectric constant of bottom layer 230 is relatively higher, preferably in the range of 8 to 35. In the preferred embodiment, the two layers of material are pressed together. In an alternate embodiment, an adhesive, such as 3M Company silicone/acrylic double coated film tape 9731, may be used to affix the two layers together. The present invention is not limited to the use of only two layers of material. More than two layers may be used to create the required dielectric constant gradient as shown below in Table 17. In this case, the gradient would be in discrete steps.

Gradients of both types, continuous (as shown in FIG. 6) or step-wise (as shown in FIG. 7), are both within the scope of the invention.

Also of interest in determining the proper configuration for top layer 220 and bottom layer 230 is the thickness of each. The following tables represent empirical data obtained using a Model X1020 tag manufactured by Matrics, Inc. in conjunction with a metal substrate. The tag/metal substrate, with or without an isolator, was suspended inline with a Matrics RDR-001 reader and the combination was moved away from the reader until the tag could no longer be read. This distance was recorded as the read distance. The columns represent the thickness of bottom layer 230 in inches, while the rows represent the thickness of top layer 220 in inches. The values included in Table 1 are the recorded read distances (in inches) at that particular configuration, where the dielectric constant of top layer 220 (k1) is 1.7 and the dielectric constant of bottom layer 230 (k2) is 18. For example, in Table 1, a top layer 220 of 0.026 inches and a bottom layer 230 of 0.023 inches yield a read distance of 30 inches. Table 2 represents similar empirical data, where the dielectric constant of layer 220 (k1) is 2.0 and the dielectric constant of layer 230 (k2) is 31.0. Finally, Table 3 represents the empirical data when the dielectic constant of layer 220 (k1) is 1.2 and the dielectric constant of layer 230 (k2) is 31.0.

TABLE 1 k1 = 1.7 and k2 = 18

| | | Bottom Layer thickness (inches) | | | | | | |
|---|---|---|---|---|---|---|---|---|
| | | .017 | .023 | .027 | .034 | .040 | .044 | .052 |
| Top Layer Thickness (inches) | .010 | 0 | 0 | 13 | 12 | 12 | 12 | 20 |
| | .016 | 20 | 13 | 20 | 19 | 20 | 19 | 20 |
| | .021 | 13 | 13 | 20 | 20 | 21 | 20 | 21 |
| | .026 | 21 | 30 | 30 | 28 | 33 | 36 | 28 |
| | .031 | 26 | 27 | 33 | 28 | 34 | 28 | 28 |
| | .037 | 29 | 29 | 39 | 36 | 38 | 24 | 28 |
| | .043 | 20 | 32 | 36 | 38 | 25 | 25 | 28 |

TABLE 2 k1 = 2 and k2 = 31

| | | Bottom Layer thickness (inches) | | |
|---|---|---|---|---|
| | | .023 | .033 | .053 |
| Top Layer Thickness (inches) | .017 | 12 | 13 | 20 |
| | .021 | 17 | 19 | 21 |
| | .034 | 22 | 19 | 24 |
| | .037 | 36 | 20 | 27 |
| | .043 | 35 | 35 | 28 |

TABLE 3 k1 = 1.2 and k2 = 31

| | | Bottom Layer thickness (inches) | | |
|---|---|---|---|---|
| | | .023 | .033 | .053 |
| Top Layer Thickness (inches) | .035 | 22 | 28 | 39 |

The efficacy of the isolator is influenced by at least two parameters; the total thickness of the isolator and the thickness of each layer. This may be more clearly seen by recasting the data in Tables 1–3 using these parameters, as shown in Tables 4–6, respectively. In these tables, the rows represent the total thickness of the isolator in inches, which is simply the sum of the top layer and the bottom layer from Tables 1–3. The columns represent the proportion of the isolator that is the lower dielectric constant (tag side) in percent, which is simply the ratio of the tag side dielectric to the total isolator thickness.

TABLE 4 k1 = 1.7 and k2 = 18
k = 1.7 Layer Thickness/Total Isolator Thickness, %

| Total Thickness (inches) | 0% | 1–9.9% | 10–19.9% | 20–29.9% | 30–39.9% | 40–49.9% | 50–59.9% | 60–69.9% | 70–79.9% | 80–89.9% | 90–99.9% | 100% |
|---|---|---|---|---|---|---|---|---|---|---|---|---|
| 0.020–0.0399 | | | | 13 | 0, 0 | 13, 20 | 13 | | | | | |
| 0.040–0.0599 | | 12 | 12, 12, 20 | 19, 20, 20 | 20, 13, 30 | 27, 30, 33 | 21, 26, 29 | | | | | |
| 0.060–0.0799 | | 20 | 19, 20, 21 | 20, 28, 21, 36, 33 | 28, 28, 34, 28, 38 | 36, 38, 39 | 29, 32, 36 | 20 | | | | |
| 0.080–0.0999 | | | | 28 | 28, 28, 24, 25 | 25 | | | | | | |

TABLE 5 k1 = 2 and k2 = 31
k = 2 Layer Thickness/Total Isolator Thickness, %

| Total Thickness | 0% | 1–9.9% | 10–19.9% | 20–29.9% | 30–39.9% | 40–49.9% | 50–59.9% | 60–69.9% | 70–79.9% | 80–89.9% | 90–99.9% | 100% |
|---|---|---|---|---|---|---|---|---|---|---|---|---|
| 0.020–0.0399 | | | | | | | | | | | | |
| 0.040–0.0599 | | | | | 13, 19 | 12, 17 | 22 | | | | | |
| 0.060–0.0799 | | | 20, 21 | | | | 19, 20, 35 | 36, 35 | | | | |
| 0.080–0.0999 | | | | | 24 | 27, 28 | | | | | | |

TABLE 6 k1 = 1.2 and k2 = 31
k = 1.2 Layer Thickness/Total Isolator Thickness, %

| Total Thickness | 0% | 1–9.9% | 10–19.9% | 20–29.9% | 30–39.9% | 40–49.9% | 50–59.9% | 60–69.9% | 70–79.9% | 80–89.9% | 90–99.9% | 100% |
|---|---|---|---|---|---|---|---|---|---|---|---|---|
| 0.020–0.0399 | | | | | | | | | | | | |
| 0.040–0.0599 | | | | | | | | | 22 | | | |
| 0.060–0.0799 | | | | | | | 28 | | | | | |
| 0.080–0.0999 | | | | | 39 | | | | | | | |

As shown in these tables, isolator efficacy generally increases with increasing total isolator thickness but the magnitude of that benefit depends on the relative proportions of the two layers. For example, in Table 4, a 0.040–0.0599 inch thick isolator yielded a 12-inch read range when the dielectric constant equals 1.7 layer was 10-20% of the total thickness. This increased to a 30-inch read range when the dielectric constant equals 1.7 layer was 50–60% of the total thickness.

For performance testing, a tag mounted on metal substrate, with or without isolator material interposed between the tag and metal, when suspended a significant distance from the reader antenna can be subject to multipath and other RF interference problems from the surrounding environment. To overcome this, well-known concepts of performing tests in an anechoic chamber to eliminate RF interference and power attenuation to simulate changing read distance were used for subsequent testing.

A test chamber was constructed consisting of a 48"×48"×49½" box of ¾" plywood oriented with the long dimension being the vertical orientation. In the top surface of the box a centrally located 24"×24" window was cut. In this window was mounted a 1" sheet of RF transparent polystyrene foam and all remaining interior surfaces were covered with Emerson & Cuming Microwave Products, Inc. pyramidal absorber for anechoic chambers ECCOSORB® VHP-4. All testing was performed with a ThingMagic Mercury4™ reader, antenna and cables. Inside the box, inline with the top window, the ThingMagic Mercury4 antenna was mounted at a distance of 34⅛" from the polystyrene foam window. A test sample to be read was placed on the upper surface of the polystyrene foam, such that the test sample was in vertical alignment with the reader at a separation of 35⅛". The test sample comprised a three element "sandwich". This sandwich comprised the selected RFID tag in contact with the upper surface of the polystyrene foam, the test isolator placed over the upper surface of the RFID tag, and a metal plate placed over the upper surface of the isolator. The antenna configuration was 4 combined UHF Transmit/Receive antennas with circular polarization. Power attenuation was effected by mean of software supplied by Rush Tracking Systems, Inc, which instructs the reader. Attenuation was with reference to 32.5 dBm transmission power (30.0 dBm power at the antenna). The reader was instructed to read the tag 20 times and record the percent read rate, that is the number of successful reads divided by the number of read attempts.

For testing purposes, a minimum 75% read rate was set as the critical value for judging a successful read of the tag at any given power attenuation. For a given isolator-tag test, the reader determined the read rate at 32.5 dBm transmission power. If the read rate was 0%–74.99%, the test condition was recorded as no read (n). If the read rate was 75.00% or greater, the transmission power was decreased stepwise in 0.50 dB increments until a read rate less than the 75.00% threshold was reached and the corresponding dB attenuation was recorded. As stated earlier, the antenna—tag separation in the test apparatus was approximately 35 inches. Thus, a value of 0.0 attenuation, in other words, a successful read at 32.5 dBm transmission power, signified a read distance of approximately 3 feet. Successful reading of the tag at increasing attenuation simulated increasing read distances. The conversion of attenuation to read distance in feet was not determined. Attenuation values served to compare isolator performance between test conditions.

It is important to note that a value of n signifies that the tag could not be read at a distance of 3 feet with a 75% read rate. This does not imply that the combination was inoperable; only that it failed to satisfy these criteria for the particular test. It is expected that the read distance of all combinations would be better than that of an air gap of the same thickness.

Figure 1A:
FIG. 1a is a view of a first antenna, tested in conjunction with the present invention.
Figure 1B:
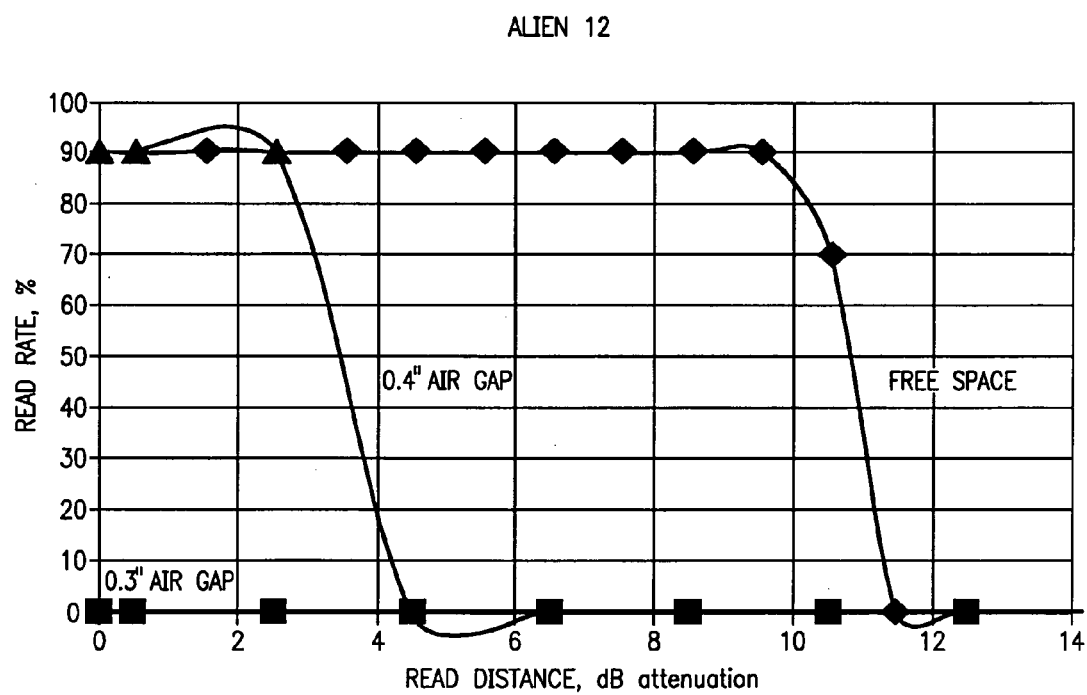
FIG. 1b is a graph depicting the read range characteristics of the first antenna.

To further demonstrate the improvement of the present invention, tags from two manufacturers were randomly selected for testing. One commercially available dipole type tag is the Alien Technology Corporation "I2" antenna design, Model ALL-9250 folded dipole. It is a Class 1 Electronic Product Code RFID tag. To verify the improvement of the present invention, a tag was randomly selected for testing. Read rates as a function of attenuation, simulating read distance, are shown in FIG. 1 for free space (no proximate metal) and varying air gap spacer for the tag in proximity to a metal substrate. The read distance of this test tag in free space with a minimum 75% read rate is approximately 10.5 dB attenuation. In proximity to a metal substrate an air gap between 0.3–0.4 inches was required to reach a minimum 75% read rate. Even with this air gap, the minimum 75% read rate is attainable at a roughly 3 dB attenuation read distance; a 7 dB degradation from the free space read distance.

Figure 2A:
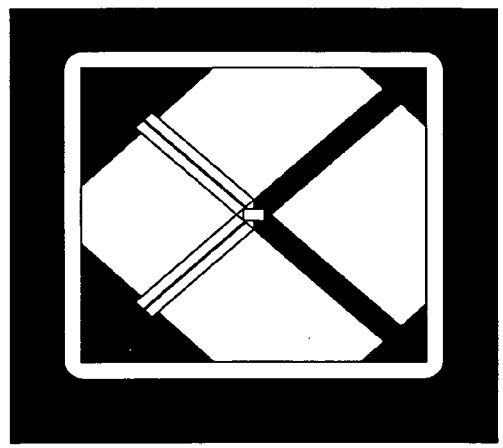
FIG. 2a is a view of a second antenna, tested in conjunction with the present invention.
Figure 2B:
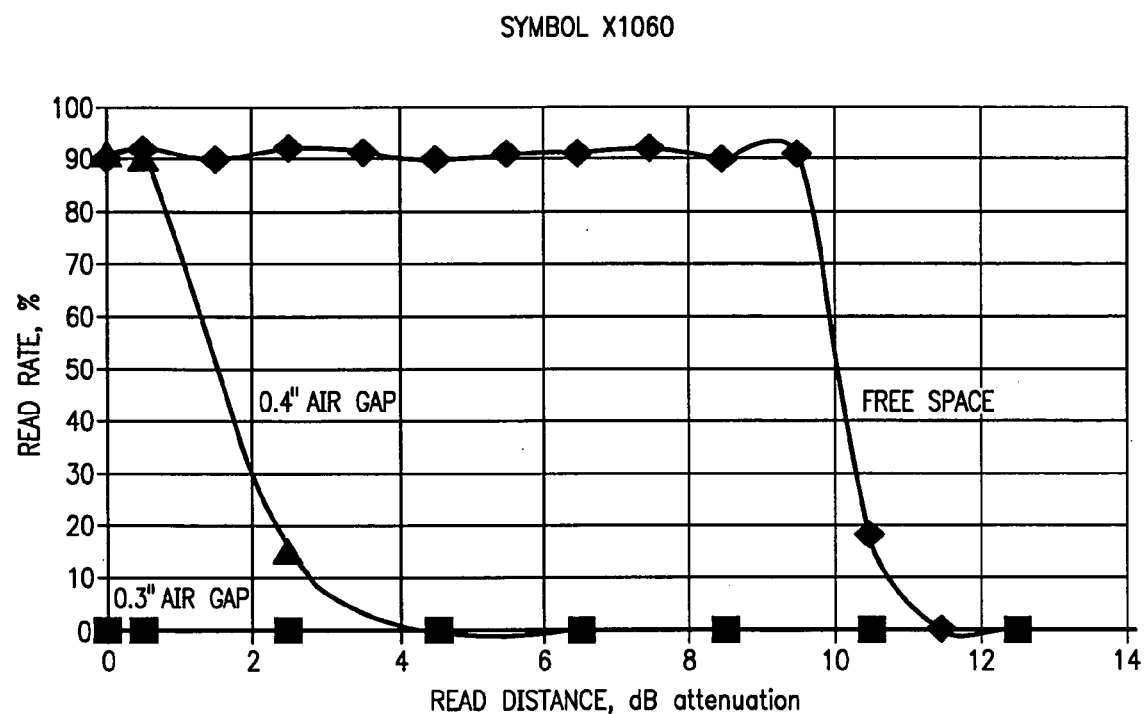
FIG. 2b is a graph depicting the read range characteristics of the second antenna.
Figure 3A:
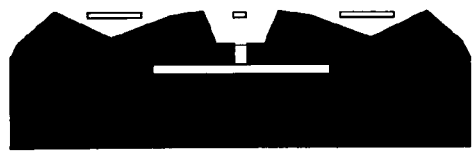
FIG. 3a is a view of a third antenna, tested in conjunction with the present invention.
Figure 3B:
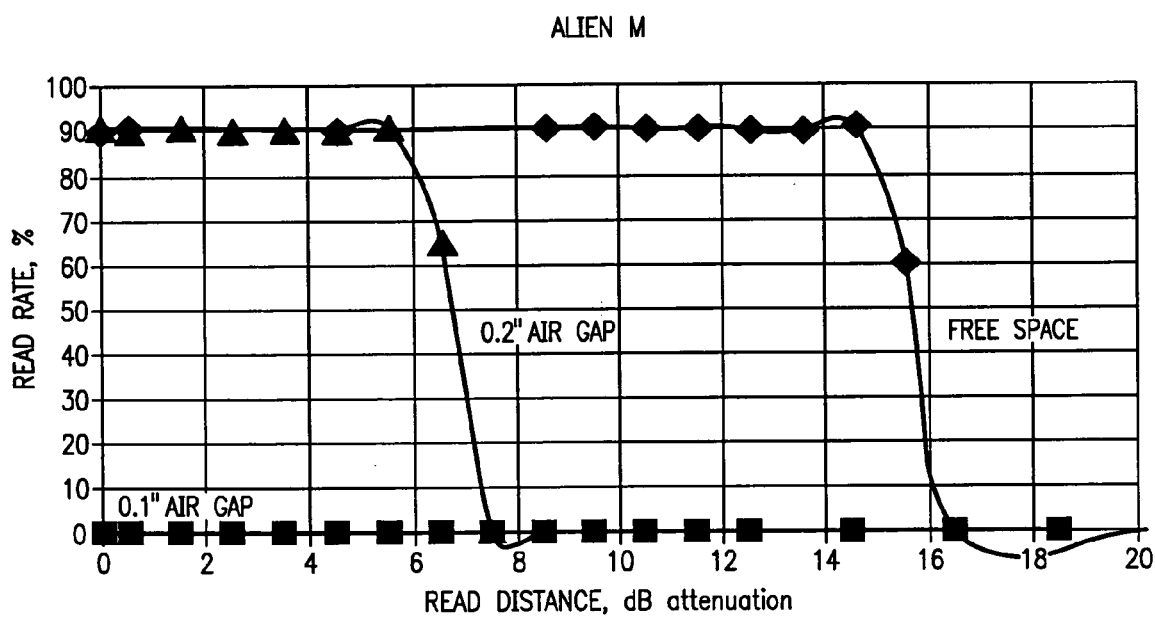
FIG. 3b is a graph depicting the read range characteristics of the third antenna.
Figure 4A:
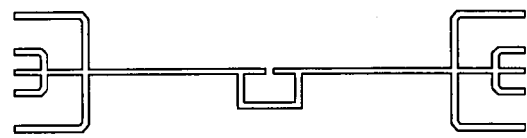
FIG. 4a is a view of a fourth antenna, tested in conjunction with the present invention.
Figure 4B:
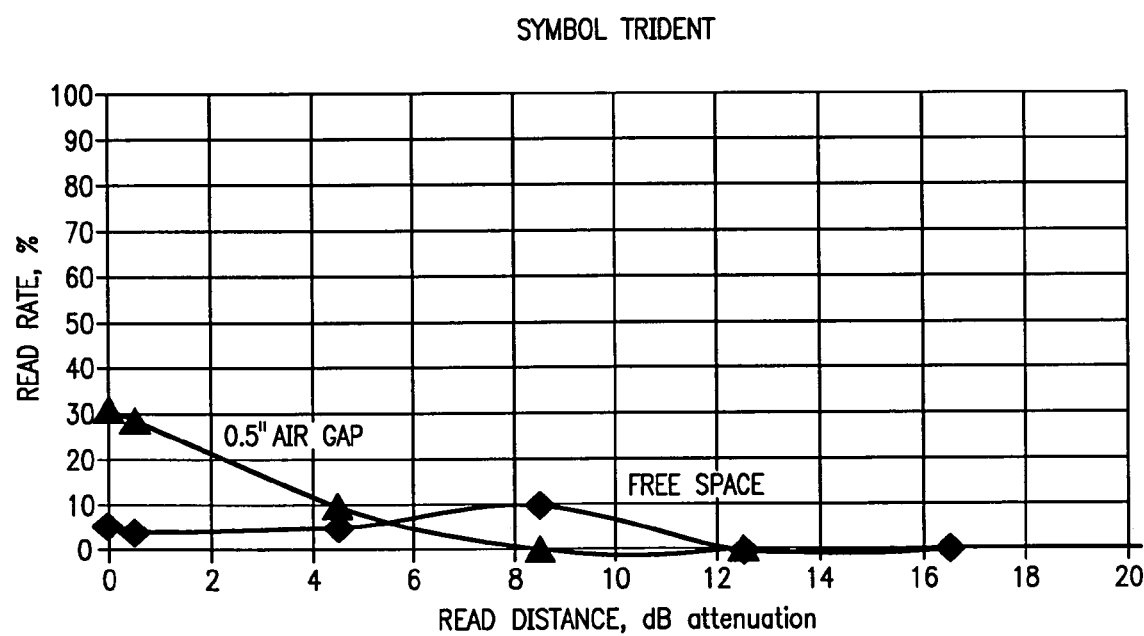
FIG. 4b is a graph depicting the read range characteristics of the fourth antenna.
Figure 5A:
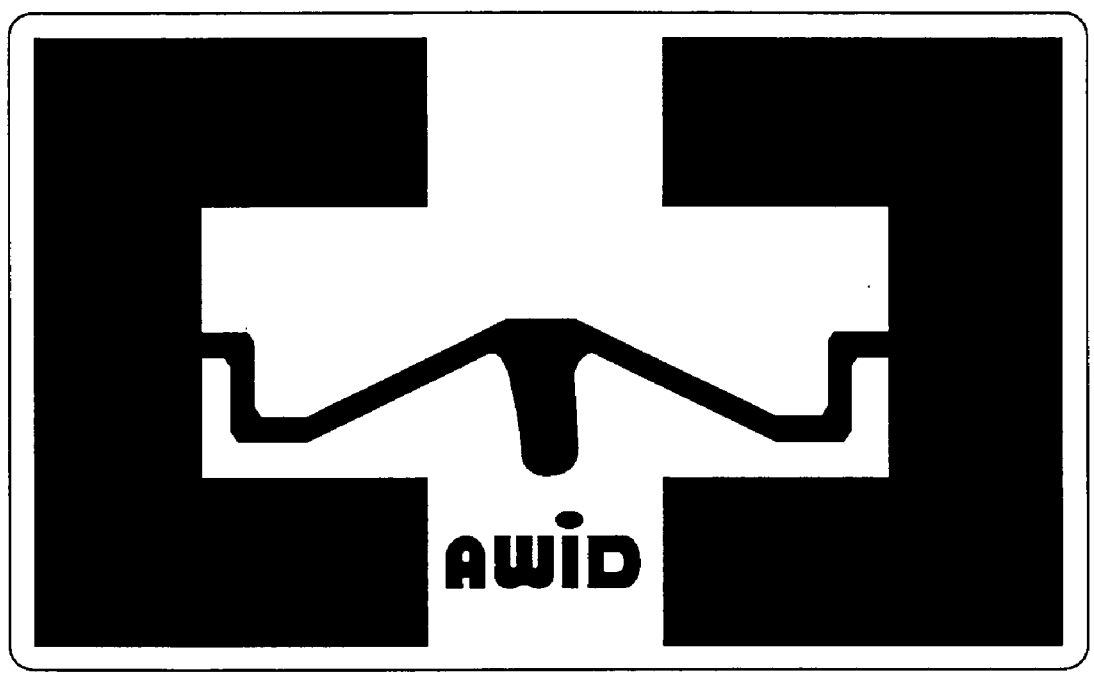
FIG. 5a is a view of a fifth antenna, tested in conjunction with the present invention.

A somewhat more complex antenna design is a crossed dipole design, the Symbol Technologies (formerly Matrics, Inc.) tag, Model X1060, an EPC Class 0 tag. The antenna design and read rates for free space and varying air gap spacer over a metal substrate are shown in FIGS. 2a and 2b. The read distance of the tag in free space with a minimum 75% read rate was approximately 9.5 dB attenuation. The air gap required to read over a metal substrate was between 0.3–0.4 inches. Even at this air gap, the minimum 75% read rate was achieved at a read distance of only approximately 1 dB; a degradation of 8.5 dB as compared to the free space read distance.

Sheets of low loss dielectric isolator materials of various thickness comprising the dielectric constants, k, of 2, 4, 9–10, 16, 20, and 30 were prepared by blending titanium dioxide with an appropriate silicone elastomer prepolymer blend and a curing agent, casting a sheet, and curing the cast sheet either at room temperature or elevated temperature, as appropriate to the formulation. Production of such filled silicone elastomer is well known in industry. As the dielectric constant of the formulation is related to the specific gravity, formulations where the dielectric constant is less than about 4 may be foamed with agents such as air and gases, low-boiling organic liquids, chemical blowing agents, or hollow microspheres to reduce the specific gravity. Tables 7–16 illustrate the present invention for two layer gradient isolators representing the following combinations:

| Table # | Lower Dielectric Value | Higher Dielectric Value | Antenna |
|---|---|---|---|
| 7 | 2 | 30 | Alien I2 |
| 8 | 2 | 20 | Alien I2 |
| 9 | 2 | 16 | Alien I2 |
| 10 | 4 | 30 | Alien I2 |
| 11 | 9–10 | 30 | Alien I2 |
| 12 | 2 | 30 | Symbol X1060 |
| 13 | 2 | 16 | Symbol X1060 |
| 14 | 2 | 9–10 | Symbol X1060 |
| 15 | 4 | 30 | Symbol X1060 |
| 16 | 9–10 | 30 | Symbol X1060 |

As was the case in Tables 4–6, in Tables 7 through 16, the rows represent the total thickness of the isolator in inches, and the columns represent the proportion of the isolator that is the lower dielectric constant (tag side) in percent. The value(s) in each cell record the read distance, in dB, where n means that the minimum 75% read rate was not achieved. Where more that one value is listed in a cell, the values do not represent duplicate runs of the same isolator sample. Rather, each value represents a slightly different combination of layers whose total isolator thickness and dielectric constant combination conform to that cell. The isolator material is referenced as k=X/k=Y, where k=X designates the dielectric constant of the layer facing the tag and k=Y designates the dielectric constant of the layer interfacing the metal substrate. For example, k=2/k=30 signifies a two layer isolator with the tag side being a dielectric material of k=2 dielectric constant and the metal side being a dielectric material of k=30.

It is shown in these Tables that for the Alien I2 tag, with the exception of k=4, Table 10, a single dielectric constant isolator does not allow the tag to read, as shown in the 0% and 100% columns. However, a two-layer gradient tag provides tag readability. Tables 7–9 illustrate the effect of varying the high dielectric constant metal side of the isolator while maintaining the low dielectric constant tag side of the isolator at k=2. Tags are readable provided the high dielectric constant tag side is greater than k=16. These Tables further demonstrate that in addition to the dielectric constants of the isolator, the total thickness of the isolator and the proportions of the low and high dielectric constant thickness must be considered in selecting the optimal isolator composition.

TABLE 7

Alien I2 Tag Read Distance, dB attenuation
Isolator: k = 2/k = 30
k = 2 Layer Thickness/Total Isolator thickness, %

| Total Thickness | 0% | 1–9.99% | 10–19.99% | 20–29.99% | 30–39.99% | 40–49.99% | 50–59.99% | 60–69.99% | 70–79.99% | 80–89.99% | 90–99.99% | 100% |
|---|---|---|---|---|---|---|---|---|---|---|---|---|
| 0.040–0.0599 | n, n | | n, n, n | n, n, n | n, n | n, n, n | n | n | | | | n |
| 0.060–0.0799 | n | n | n, n | n, n, n | n, n, n | n | n | n, n | | | | n |
| 0.080–0.0999 | n | n | n, n | n | n | n | n, n | | n, n | | | n, n |
| 0.100–0.1199 | n | n | n, n, 1.0 | n | n | n | n | n | n, n | | | n |
| 0.120–0.1399 | n | n | 2.0 | n | n | | n, n | n, n | n | n | | n |
| 0.140–0.1599 | n | n, n, n | 0.0, 2.5 | | n | n | | n | n | n | | n |
| 0.160–0.1799 | n | n, n | n, 2.5 | 3.5 | | n, n | n | n | n | n | | n |
| 0.180–0.1999 | n | n, n, n, n | n, 2.5, 4.5 | 3.5, 7.5 | | | n | | n, n | n, n, n, n | | n |
| 0.200–0.2199 | n | n, n, n, n | 3.0, 1.0, 5.0 | | 0.5, 3.5, 3.5 | | n | n | n, n | n, n, n, n | | n |

TABLE 8

Alien I2 Tag Read Distance, dB attenuation
Isolator: k = 2/k = 20
k = 2 Layer Thickness/Total Isolator thickness, %

| | 0% | 1–9.99% | 10–19.99% | 20–29.99% | 30–39.99% | 40–49.99% | 50–59.99% | 60–69.99% | 70–79.99% | 80–89.99% | 90–99.99% | 100% |
|---|---|---|---|---|---|---|---|---|---|---|---|---|
| 0.040–0.0599 | n, n | | n, n, n | n, n, n | n, n | n, n, n | n | n | | | | n |
| 0.060–0.0799 | n | n, n | n, n | n | n, n, n | | n, n | n, n | | | | n |
| 0.080–0.0999 | n | n | n, n, n, n | n, n | n | n | n, n | | n, n | | | n, n |
| 0.100–0.1199 | n | n, n | | n, 2.0 | n, 3.5 | n | n | n | n, n, n | | | n |
| 0.120–0.1399 | n | n, n | n, 0.5, 2.5 | | n, 0.5 | | n, n | n | | n, n | | n |
| 0.140–0.1599 | n | n, n | n, 2.5 | 2.5 | 2.5 | n, 1.5 | n | | n, n | n, n | | n |
| 0.160–0.1799 | n | n, n | n, 2.5 | 3.5, 4.5 | 2.5 | | 1.5 | n | n, n | | | n |
| 0.180–0.1999 | n | n, n, n, n, n, n | n, 3.5 | 3.5 | 4.5 | 2.5 | 1.5, 3.5 | | n | n, n, n, 0.5 | | n |
| 0.200–0.2199 | n | n, n | 0.0, 3.5, 4.5, 4.5 | | 1.5, 4.5 | | 3.5 | n, 1.5 | 0.5, 1.5, 3.5 | 0.5, 0.5, 0.5, 1.5 | | n |

TABLE 9

Alien I2 Tag Read Distance, dB attenuation
Isolator: k = 2/k = 16
k = 2 Layer Thickness/Total Isolator thickness, %

| Total Thickness | 0% | 1–9.99% | 10–19.99% | 20–29.99% | 30–39.99% | 40–49.99% | 50–59.99% | 60–69.99% | 70–79.99% | 80–89.99% | 90–99.99% | 100% |
|---|---|---|---|---|---|---|---|---|---|---|---|---|
| 0.040–0.0599 | n | | | | | | | | | | | n |
| 0.060–0.0799 | | | | | | | | | | | | n |
| 0.080–0.0999 | n | n | | n | n | | | | n | | | n, n |
| 0.100–0.1199 | n, n | | n, n, n | n | | n | | | n | | | n |
| 0.120–0.1399 | n | | | n | | | n, n | | n | | | n |
| 0.140–0.1599 | n | n | | | n | | | | | | | n |
| 0.160–0.1799 | n | n, n | n, n | | | n, n | | n | | n | | n |
| 0.180–0.1999 | n | | n | | | | | n | | n | | n |
| 0.200–0.2199 | n | n, n, n | | n | | | n | | n | n, n | | n |

TABLE 10

Alien I2 Tag Read Distance, dB attenuation
Isolator: k = 4/k = 30
k = 4 Layer Thickness/Total Isolator thickness, %

| Total Thickness | 0 | 1–9.99 | 10–19.99 | 20–29.99 | 30–39.99 | 40–49.99 | 50–59.99 | 60–69.99 | 70–79.99 | 80–89.99 | 90–99.99 | 100 |
|---|---|---|---|---|---|---|---|---|---|---|---|---|
| 0.040–0.0599 | n, n | | n, n | n | n | n, 2.5, 2.5 | n | n | n | | | n |
| 0.060–0.0799 | n | | n | n, n, n, 2.5 | 1.5 | | n, n, n | n | n | | | n, n |
| 0.080–0.0999 | n | n | n | 0.5 | 0.5 | n, 0.5, 1.5 | n | | n, n | | | n |
| 0.100–0.1199 | n | n, n | n, 0.5 | | 0.0, 0.5 | 2.5 | 1.0, 2.5 | 1.5 | n, 0.0 | | | 0.5 |
| 0.120–0.1399 | n | | n, 0.5 | 0.5, 0.5 | | | | 2.5, 3.5 | 2.5, 3.5 | | | 2.5 |

TABLE 11

Alien I2 Tag Read Distance, dB attenuation
Isolator: k = 9–10/k = 30
k = 9–10 Layer Thickness/Total Isolator thickness, %

| Total Thickness | 0% | 1–9.99% | 10–19.99% | 20–29.99% | 30–39.99% | 40–49.99% | 50–59.99% | 60–69.99% | 70–79.99% | 80–89.99% | 90–99.99% | 100% |
|---|---|---|---|---|---|---|---|---|---|---|---|---|
| 0.040–0.0599 | n, n | n, n, n | | n, n | n, n | n | n, n | | | | | n |
| 0.060–0.0799 | n | | | n, n, n, n | n | n, n | n | n, n, n, n | | | | n |
| 0.080–0.0999 | n | n | n, n | | n, n | n, n, n | n, n, n | n | n, n | | | n |
| 0.100–0.1199 | n | n, n | n, n | n, n | | n | n | n, n | n, n, n | | | n |
| 0.120–0.1399 | n | | n, n | n, n, n | n, n | | n, n | n, n, n, | | | | n |
| 0.140–0.1599 | n | n, n | n | n, n | n, n, n | n, n | | n | n | n, n, n, n | | n |
| 0.160–0.1799 | n | n, n, n | n, n, n | n | | n, n | n | | n, n, n | n, n | | n |
| 0.180–0.1999 | n | n, n, n, n, n | | n | n, n | n | n, n, n | | n, n | n, n | | n |
| 0.200–0.2199 | n | n | n, n, n, n, n | | n, n, n | | n | | n | n, n | | n |

Tables 7, 10, and 11 illustrate the effect of increasing the dielectric constant of the low dielectric tag side of the isolator while maintaining the high dielectric constant metal side of the isolator at k=30. When the low dielectric constant side of the isolator reached a value of k=9–10, the tag was no longer readable. Again, consideration of total isolator thickness and proportions of the two dielectric constants in the isolator are important factors in determining the optimal composition of the isolator. It is important to note that the last two rows of Table 10 show that an isolator comprising 100% k=4 material can be read, when the thickness of the material is greater than 0.100 inches. The read rates achieved by this homogenous material are not significantly different than those achieved by gradient layer isolators of the same thickness. However, the gradient isolator also provides tag readability using a significantly thinner isolator and therefore provides an improvement over the single dielectric constant isolator.

It has also been found that the defining limits noted in Tables 7–11 are specific for a given antenna design. Thus, the optimal composition of the isolator material may be different for different antenna designs, as shown in Tables 12–16 for the Symbol Technologies Model X1060 tag.

The response of this tag design to dielectric gradient isolators is in general similar to that of the Alien I2 tag, in that gradient dielectric isolators were more effective then homogeneous isolators. In all cases, the total isolator thickness, the ratio of the thicknesses of the low and high dielectric constant portions and the actual dielectric constants of the low and high dielectric portions combine to determine the effectiveness of the isolator. However, there are differences in the optimal configuration, which is indicative of the fact that each unique antenna design can require different isolation material parameters.

TABLE 12

Symbol X1060 Tag Read Distance, dB attenuation
Isolator: k = 2/k = 30
k = 2 Layer Thickness/Total Isolator thickness, %

| Total Thickness | 0% | 1–9.9% | 10–19.9% | 20–29.9% | 30–39.9% | 40–49.9% | 50–59.9% | 60–69.9% | 70–79.9% | 80–89.9% | 90–99.9% | 100% |
|---|---|---|---|---|---|---|---|---|---|---|---|---|
| 0.040–0.0599 | n | | | n | n | n | n | n | | | | n |
| 0.060–0.0799 | n | | n | n, n | n | n | n | n | | | | n |
| 0.080–0.0999 | n | | | | 2.5 | 3.5 | 2.5 | | 1.5 | | | n |
| 0.100–0.1199 | n | | 3.5 | 3.5 | | 7.5 | 6.5 | 3.5 | | | | n |
| 0.120–0.1399 | n | | 3.5 | 7.5 | 5.5 | | | | | | | n |
| 0.140–0.1599 | n | | | | | 9.5 | | | | | | 1.5 |
| 0.160–0.1799 | n | | | | 9.5 | | | | | | | 2.5 |

TABLE 13

Symbol X1060 Tag Read Distance, dB attenuation
Isolator: k = 2/k = 16
k = 2 Layer Thickness/Total Isolator thickness, %

| Total Thickness | 0% | 1–9.9% | 10–19.9% | 20–29.9% | 30–39.9% | 40–49.9% | 50–59.9% | 60–69.9% | 70–79.9% | 80–89.9% | 90–99.9% | 100% |
|---|---|---|---|---|---|---|---|---|---|---|---|---|
| 0.040–0.0599 | n | | | | | | | | | | | n |
| 0.060–0.0799 | | | | | | | | | | | | n |
| 0.080–0.0999 | n | | | | 3.5 | 4.5 | | 7.5 | | 2.5 | | n |
| 0.100–0.1199 | n, n | | n, n | | 4.5 | | 3.5 | 10.5 | 8.5 | 2.5 | | n |
| 0.120–0.1399 | n | | | | 5.5 | 7.5 | | 3.5 | | 0.0 | | n |
| 0.140–0.1599 | n | | | | | | | | | | | 1.5 |
| 0.160–0.1799 | n | 2.5 | 2.5, 4.5 | | | | 7.5, 9.5 | | | 4.5 | | 2.5 |

TABLE 14

Symbol X1060 Tag Read Distance, dB attenuation
Isolator: k = 2/k = 9–10
k = 2 Layer Thickness/Total Isolator thickness, %

| Total Thickness | 0% | 1–9.9% | 10–19.9% | 20–29.9% | 30–39.9% | 40–49.9% | 50–59.9% | 60–69.9% | 70–79.9% | 80–89.9% | 90–99.9% | 100% |
|---|---|---|---|---|---|---|---|---|---|---|---|---|
| 0.040–0.0599 | n | | n | n | n | n | | | n | | | n |
| 0.060–0.0799 | n | n | n, n | n | n | n | n | n | n | | | n |
| 0.080–0.0999 | n | n | n, n | n | | n | 4.5 | | 0.0 | n, n | | n |
| 0.100–0.1199 | n | 0.5 | 1.5 | 3.5 | 3.5 | 8.5 | 5 | 4.5 | 2.0 | | | n |
| 0.120–0.1399 | n | | 0.5, 3.5 | 4.5 | 6 | | 7.5 | 5.5 | | 2.0 | | n |
| 0.140–0.1599 | n | 0.0 | | 5.5 | 6.5 | 9.5 | 7.5 | 7.5 | 5.5 | 2.5 | 2.5 | 1.5 |
| 0.160–0.1799 | n | 3.5 | | 5.5 | 11.5 | | | 8.5 | 6.5 | 5.5 | 3.5 | 2.5 |

TABLE 15

Symbol X1060 Tag Read Distance, dB attenuation
Isolator: k = 4/k = 30
k = 4 Layer Thickness/Total Isolator thickness, %

| Total Thickness | 0% | 1–9.9% | 10–19.9% | 20–29.9% | 30–39.9% | 40–49.9% | 50–59.9% | 60–69.9% | 70–79.9% | 80–89.9% | 90–99.9% | 100% |
|---|---|---|---|---|---|---|---|---|---|---|---|---|
| 0.040–0.0599 | n | | n, n | n | n, n | n, n | n | | | | | n |
| 0.060–0.0799 | n | | n | n, n<br>1.5, 1.5 | | n | n, n, n | n | n | | | n |
| 0.080–0.0999 | n | | n | n | 3.5 | 3.0, 3.5, 3.5 | 1.0 | n | 4.5 | | | 1.5 |
| 0.100–0.1199 | n | | n | | 0.5, 3.5 | 4.5 | 4.5, 5.0 | 5 | | | | 2.0 |
| 0.120–0.1399 | n | | 2.5 | 2.0, 3.5 | | 3.5 | 4.5, 5.5 | 5.5, 0.0 | | | | 5.5 |

TABLE 16

Symbol X1060 Tag Read Distance, dB attenuation
Isolator: k = 9–10/k = 30
k = 9–10 Layer Thickness/Total Isolator thickness, %

| Total Thickness | 0% | 1–9.9% | 10–19.9% | 20–29.9% | 30–39.9% | 40–49.9% | 50–59.9% | 60–69.9% | 70–79.9% | 80–89.9% | 90–99.9% | 100% |
|---|---|---|---|---|---|---|---|---|---|---|---|---|
| 0.040–0.0599 | n | | | | n | n | n | n | | | | n |
| 0.060–0.0799 | n | | | | n | n | n | n | n | | | n |
| 0.080–0.0999 | n | | n | | n, n | n | n | n | | n | | n |
| 0.100–0.1199 | n | | n | n | | n | n | n | n | | | n |
| 0.120–0.1399 | n | | n | n | n | | n | n, n | | | | n |
| 0.140–0.1599 | n | | n | n | n | n | | n | 3.5 | n | | n |
| 0.160–0.1799 | n | n, n | n | n | n | n | | 0.5 | 0.5 | 3.5 | | n |

Unlike the Alien I2 tag, all of the combinations of low k/high k tested exhibited some thickness between 0.040–0.1799 inches where the isolation was sufficient to allow the tag to be read. Further, when the isolator was at least 0.140 inches thick, even a single dielectric material isolated the tag when the dielectric constant was less than k=9–10. However, when the low dielectric constant tag side of the isolator was k=2 and the high dielectric constant metal side was k=16 or greater, the advantage of a gradient dielectric constant isolator over that of a single dielectric constant isolator was highly significant, typically 7 dB or greater read distance.

As described above, the combination of isolator total thickness and proportions of low and high dielectric constant layers that maximized tag read distance differs between the two antenna designs.

At tag side dielectric constant k=2, the Alien folded dipole tag responded best to isolators with the k=2 material being 10–30% of the total isolator, while the Symbol crossed dipole tag was best in the 30–60% range. The crossed dipole tag also yielded significantly greater read distances, with the tag/isolator/metal equaling the free space read distance in the best cases.

As an example of an alternate dielectric gradient, isolators were prepared based on an approximately linear logarithmic gradient of the dielectric constants by sandwiching 0.027-inch thick sheets of the appropriate dielectric constant. Data are shown in Table 17.

TABLE 17

| Total Isolator Thickness = 0.137 +/− 0.001 inches | | | |
|---|---|---|---|
| Dielectric Gradient | 20% k = 2 80% k = 30 | 20% k = 2 20% k = 4 60% k = 30 | 20% k = 2 20% k = 4 20% k = 9 40% k = 30 | 20% k = 2 20% k = 4 20% k = 9 20% k = 16 20% k = 30 |
| Read Distance (dB attenuation) | 4.5 | 6.5 | 6.5 | 3.5 |

Mirroring the results of two layer dielectric gradients, the best read distances were obtained when the low dielectric constant tag side of the isolator constituted 30–60% of the total isolator thickness.

Figure 8:
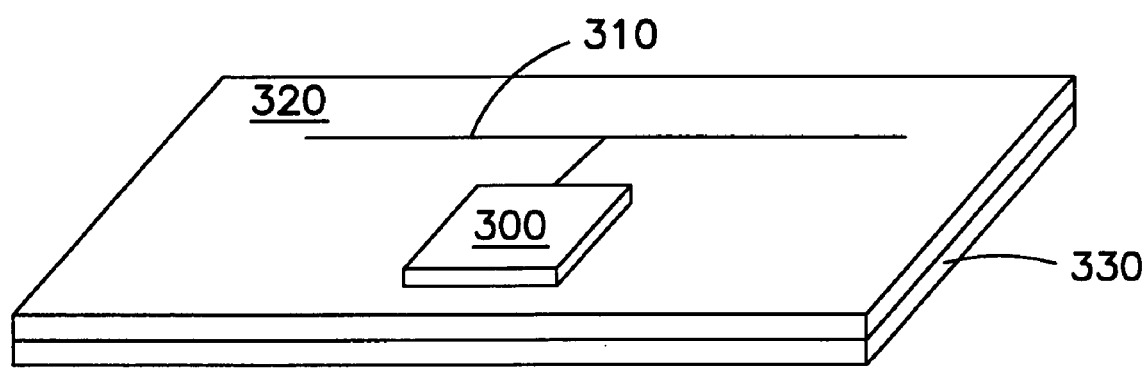
FIG. 8 shows a third embodiment of the present invention.

FIG. 8 shows a third embodiment of the present invention. While the previous two embodiments utilized existing RFID tags, FIG. 8 combines these existing RFID tags with the present invention to create an integral solution.

Integrated Circuit 300 is affixed to the top surface of substrate 320, such as by soldering or gluing. This integrated circuit preferably contains the identifying information related to the article. Substrate 320 typically consists of a printed circuit board, although other substrates are possible. In most RFID tags, the antenna 310 is affixed directly to the substrate 320. In many applications, the antenna 310 is created by printing specially sized and spaced wire etches directly on the substrate 320. Those skilled in the art are familiar with various processes of embedding antennas into printed circuit boards.

Affixed to the opposite surface of substrate 320 is a layer of material 330. In one embodiment, the layer of dielectric gradient material described with respect to FIG. 6 is directly affixed to the bottom of the substrate 320. In a second embodiment, two layers of material, similar to those described in connection with FIG. 7, are affixed to the bottom of the substrate 320 such that the layer with the low dielectric constant is between the substrate and the layer with a high dielectric constant. As described above, more than two layers can be used to create the desired dielectric constant gradient. In yet a third embodiment, the dielectric constant gradient is created by applying material directly on the bottom surface of the substrate 320, such as by printing.

Without being limited to any particular theory, the following offers a hypothesis to explain this result.

As is known by those skilled in the art, most RFID tag antennas for high frequencies are types or modifications of dipole antennas, since dipoles can be easily printed or etched on a substrate. A well-designed RFID tag will match the antenna impedance at the terminals to the chip/rectifier impedance to maximize the power transfer. Antenna performance depends on the properties of the substrate material. A dipole on a substrate of a particular dielectric constant will perform differently when put on a substrate with a different dielectric constant.

The simplest dipole is a strip of conductive material that is one-half wavelength long at the operating frequency. If this same antenna is placed on a high dielectric substrate, the operating frequency will change based on the value of the dielectric constant of the substrate. Also the bandwidth of the dipole, where bandwidth is defined as the range of frequencies for which the antenna will have useful operating parameters, will decrease. Equations illustrating these phenomena tend to be derived empirically as a rigorous exact solution would be computationally prohibitive.

Tag antennas are optimized for use in free space or on low dielectric materials, such as corrugated cardboard, pallet wood, etc. When an RFID tag is in proximity to a metallic substrate the impedance of the tag antenna changes. The effect of the metal is to modify the impedance of the antenna. This affects the electromagnetic match between the antenna and the chip. The optimum frequency of the antenna will shift (to a lower frequency) and the bandwidth of the antenna will be reduced. The bandwidth becomes important since RFID readers use 'frequency hopping' or constant changes in frequency around the center frequency to conform to FCC regulations. A reduction in antenna bandwidth would impact read range based on which frequency is being used at that moment. Further, future standards are expected to require an RFID system to be capable of operation at all applicable frequencies without special adaptation, such that operation over the full 869 MHz to 953 MHz bandwidth is necessary. The closer the tag is to the metal the greater this mismatch becomes. At a certain distance, the chip's threshold voltage will not be reached and the tag will not be read. The distance at which the tag stops reading is dependent on the tag antenna, the chip/rectifier and the reader.

It is believed that the present invention, having material with a dielectric gradient, performs two important functions. First, the material at the interface with the tag is of sufficiently low dielectric constant that it does not significantly affect the properties of the substrate or the tag antenna. Thus, the tag antenna can maintain frequency and bandwidth performance. Secondly, the interface with the metal (or high water content) substrate is of a sufficiently high dielectric constant so as to isolate the tag from the article substrate and therefore lessen the modification to the antenna impedance.

Since different RFID tags use different antenna designs, the dielectric gradient material used to insulate the RFID tag from the metal surface will be dependent on the tag antenna, chip and reader. Each RFID tag differs in antenna type and performance, chip type, reader protocol, etc.

It is therefore expected that it will be necessary to change the parameters of the dielectric constant gradient to optimize the material for each tag type. However, the principle of the dielectric gradient isolator is expected to be universal for high frequency RFID tags.

While the use of two or more distinct dielectric constant materials has been shown to improve read distances for a variety of antenna designs, further improvements are possible.

A computer simulation of an idealized tag antenna with backing material was performed to gain insight regarding the effect of introducing complex magnetic permeability to an RFID tag isolator. Assuming a tag with IC circuitry with a complex impedance of 10−j60 ohms (where j is the square root of −1), optimal impedance at the antenna terminals would be the complex conjugate, or 10+j60 ohms. Using Sonnet Software, Inc. electromagnetic analysis modeling software, Version 10.51, the impedance at the terminals of a 4.4 inch crossed dipole RFID tag antenna with backing materials of selected electromagnetic parameters and material thickness mounted on a metallic substrate was modeled. Typical results are shown in Table 18 for air, dielectric only and dielectric plus magnetic backing material.

TABLE 18

ANTENNA TERMINAL IMPEDANCE

| Backing Thickness, inches | Air | Backing Material $\epsilon = 10 - j0.2$ | Backing material $\epsilon = 10 - j0.2$ $\mu = 5 - j1.2$ |
|---|---|---|---|
| 0.001 | 0 + j1.4 | 0 + j3.3 | 10.4 + j18.4 |
| 0.005 | 0 − j2.9 | 0.2 + j13.3 | 4.7 − j21.1 |
| 0.010 | 0 − j7.3 | 1.5 + j44 | 2.9 − j17.7 |
| 0.050 | 0 − j28 | 2.4 − j62 | 8.2 − j16.8 |
| 0.100 | 0 − j40 | 1.8 − j56 | 14.7 − j20.1 |

Simulation demonstrates that the addition of a complex permeability to the isolator significantly increases the real and imaginary terminal impedance so as to approach that of the IC circuitry impedance. Also, this effect will be strongly dependent on isolator thickness.

As shown in FIGS. 1a through 5a, a multiplicity of RFID tags, with varying antenna designs and IC circuitry are currently offered commercially. In order to satisfy the impedance matching requirements for efficient energy transfer from the reader to the tag, a multiplicity of RFID isolator properties must be available. Electromagnetic isolators provide additional latitude in attaining the isolator impedance characteristics required to enable RFID tags to be optimally read on metal substrates. The following examples serve to further demonstrate the advantages of electromagnetic RFID isolator materials.

Electromagnetic isolator material are prepared by blending ferromagnetic material with binders, such as plastics or elastomers and forming thin sheets using techniques well known to those skilled in the art. Common ferromagnetic powders suitable for this purpose are iron, nickel, cobalt and their various alloys and ferrites. Isolators of varying electromagnetic properties were prepared by blending carbonyl iron with silicone elastomer prepolymer and a curing agent, casting a sheet, and curing the cast sheet either at room temperature or elevated temperature, as appropriate to the formulation. As described earlier, production of such "filled" silicone elastomer is well known in industry. Three sample electromagnetic materials were prepared using this technique. The measured electromagnetic properties of these example isolator formulations at 915 MHz are given in Table 19.

TABLE 19

ELECTROMAGNETIC MATERIAL PROPERTIES

| | Permittivity, $\epsilon$ | Permeability, $\mu$ |
|---|---|---|
| Formulation A | 10 − j0.2 | 2.7 − j0.4 |
| Formulation B | 16 − j0.5 | 5.0 − j1.8 |
| Formulation C | 32 − j1 | 7.0 − j3.2 |

To better demonstrate the present invention, electromagnetic isolator sheets of varying electromagnetic properties and sheet thickness were prepared by layering selected sheet material. Isolators of homogeneous electromagnetic material and combined dielectric and electromagnetic material were prepared. The isolators were interposed between an RFID tag and metallic substrate and the tag readability and read range were measured.

Commercially available RFID tags representing a range of antenna designs were evaluated. A random sample of each tag style was selected for testing. The tags, along with the vendor name and model number, are listed in Table 20 and their design and read range characteristics are shown in FIGS. 1–5.

TABLE 20

EXAMPLE RFID TAGS

| FIG. | Vendor Name | Model |
|---|---|---|
| 1 | Alien Technology Corp. | ALL-9250 "I2" |
| 2 | Symbol Technologies | X1060 |
| 3 | Alien Technology Corp. | ALL-9354-02 "M" |
| 4 | Symbol Technologies | Trident |
| 5 | Applied Wireless Identifications, Inc | APL-1216 |

Testing was performed using the same anechoic test chamber and test method described above. As was the case above, a minimum 75% read rate was set as the critical value for judging a successful read of the tag at any given power attenuation (except for Symbol Trident tag tests).

In the following tests, where two layer gradients are utilized, the isolator material will be referred to as kX/Y, where the kX designates the dielectric constant of the layer facing the tag and Y designates the electromagnetic formulation from Table 19 or the dielectric constant on the layer interfacing the metal substrate. For example, k2/A signifies a two layer isolator with the tag side being a dielectric material of k=2 dielectric constant and the metal side being electromagnetic formulation A with parameters $\epsilon=10-j0.2$ and $\mu=2.7-j0.4$. An isolator designated k2/k16 signifies a two layer isolator wherein the tag side is a dielectric material of k=2 dielectric constant and the metal side is a dielectric material of k=16 dielectric constant.

The Sonnet computer simulation, shown in FIG. 18, suggested that inclusion of substantial permeability in an isolator, that is, substitution of an electromagnetic material with permeability greater than 1 for a material of equal permittivity but permeability of 1, could provide isolator efficacy. Two gradient isolators, k2/k16 and k2/B were prepared with the same total isolator thickness and layer proportion. Note, as shown in Table 19, isolator formulation B has a dielectric constant of 16 and a magnetic permeabililty of $5.0-j1.8$. Test results, shown in Table 21, demonstrate the improved isolator efficacy.

TABLE 21

| Tag | Isolator Properties | Read Distance, dB attenuation |
|---|---|---|
| Alien "M" tag | k2 (0.032")/k16 (0.084") | no read |
| Alien "M" tag | k2 (0.032")/B (0.080") | 5.5 |
| Symbol X1060 tag | k2 (0.035")/k16 (0.030") | no read |
| Symbol X1060 tag | k2 (0.035")/B (0.030") | 3.5 |

Further demonstration of the improvement available with the inclusion of an electromagnetic layer in the isolator is illustrated in Tables 22–25. Tables 22 and 23 again compare two layer isolators where the metal side is either a dielectric material with a dielectric constant of 16, or an electromagnetic material having a dielectric constant of 16 with magnetic greater than 1, specifically Formula B. Tables 22 and 23 document read distance as a function of the proportion of the isolator thickness that is the tag side layer and the total thickness of the isolator for an Alien I2 tag. Tables 24 and 25 show data for a Symbol X1060 tag, comparing two layer isolators whose metal side is either a dielectric material with a dielectric constant of 9–10 or an electromagnetic material having a dielectric constant of 10 and magnetic permeability greater than 1, specifically formulation A.

Regarding the Alien I2 tag, note that the pure dielectric isolator (k2/k1) shown in Table 22 fails to provide tag readability over all test conditions. However, under certain of the test parameters, the isolator with electromagnetic metal side layer (k2/B) allows the tag to be read, as shown in Table 23. Referring to the 0% column of table 23, note that when the electromagnetic material is at least 0.140–0.1599 inches thick, it serves to isolate the tag as a single homogeneous layer. In contrast, a homogeneous dielectric layer does not provide isolation, as documented in the 0% column of Table 22. The read distance is maximized with the dielectric-electromagnetic combination isolator, where preferably between 50% and 70% of the isolator is the lower dielectric constant material. This example demonstrates the improvement of electromagnetic isolators, as either a single homogenous material or in combination with dielectric material, over dielectric isolators for this tag design. Further, the importance of isolator thickness and proportions of gradient material in determining isolator performance is again evident.

Regarding the Symbol X1060 tag, both the dielectric gradient isolator and the dielectric-electromagnetic isolator provide isolation at thicknesses of 0.1799 inch or less. However, the k2/A isolator provides tag isolation at a thickness as small as 0.060–0.0799 inches, which can be advantageous in some cases. It is noted that the k2/k9–10 isolator optimizes at a k2 layer proportion of approximately 30–70% and the k2/A isolator optimizes at a k2 layer proportion of approximately 50–90% of the total isolator thickness for this tag.

TABLE 22

Alien I2 Tag Read Distance, dB attenuation
Isolator: k2/k16
k = 2 Layer Thickness/Total Isolator thickness, %

| Total Thickness | 0% | 1–9.99% | 10–19.99% | 20–29.99% | 30–39.99% | 40–49.99% | 50–59.99% | 60–69.99% | 70–79.99% | 80–89.99% | 90–99.99% | 100% |
|---|---|---|---|---|---|---|---|---|---|---|---|---|
| 0.040–0.0599 | n | | | | | | | | | | | n |
| 0.060–0.0799 | | | | | | | | | | | | n |
| 0.080–0.0999 | n | n | | n | n | | | | n | | | n, n |
| 0.100–0.1199 | n, n | | n, n, n | n | | n | | | n | | | n |
| 0.120–0.1399 | n | | | n | | | n, n | | n | | | n |
| 0.140–0.1599 | n | n | | | n | | | | | | | n |
| 0.160–0.1799 | n | n, n | n, n | | | n, n | | n | | n | | n |

TABLE 23

Alien I2 Tag Read Distance, dB attenuation
Isolator: k2/B
k = 2 Layer Thickness/Total Isolator thickness, %

| Total Thickness | 0% | 1–9.9% | 10–19.9% | 20–29.9% | 30–39.9% | 40–49.9% | 50–59.9% | 60–69.9% | 70–79.9% | 80–89.9% | 90–99.9% | 100% |
|---|---|---|---|---|---|---|---|---|---|---|---|---|
| 0.040–0.0599 | n | | | | | | | | | | | n |
| 0.060–0.0799 | n | | | | | | | 0.5 | | | | n |
| 0.080–0.0999 | n | | | | | | | | | | | n, n |
| 0.100–0.1199 | n | | | | | n | | | 3.5 | n | | n |
| 0.120–0.1399 | n | | | | n | | | 2.5, 4.5 | 3.5 | n | | n |
| 0.140–0.1599 | 0.5 | | | | | | 4.5, 6.5 | 5.0 | 4.0 | | | n |
| 0.160–0.1799 | | | | | | | 4.5 | 5.5, 6.0 | | | | n |

TABLE 24

Symbol X1060 Tag Read Distance, dB attenuation
Isolator: k2/k9–10
k = 2 Layer Thickness/Total Isolator thickness, %

| Total Thickness | 0% | 1–9.99% | 10–19.99% | 20–29.99% | 30–39.99% | 40–49.99% | 50–59.99% | 60–69.99% | 70–79.99% | 80–89.99% | 90–99.99% | 100% |
|---|---|---|---|---|---|---|---|---|---|---|---|---|
| 0.040–0.0599 | n | | n | n | n | n | | | n | | | n |
| 0.060–0.0799 | n | n | n, n | n | n | n | n | n | n | | | n |
| 0.080–0.0999 | n | n | n, n | n | — | n | 4.5 | | 0.0 | n, n | | n |
| 0.100–0.1199 | n | 0.5 | 1.5 | 3.5 | 3.5 | 8.5 | 5.0 | 4.5 | 2.0 | | | n |
| 0.120–0.1399 | n | | 0.5, 3.5 | 4.5 | 6.0 | | 7.5 | 5.5 | — | 2.0 | | n |
| 0.140–0.1599 | n | 0.0 | | 5.5 | 6.5 | 9.5 | 7.5 | 7.5 | 5.5 | 2.5 | 2.5 | 1.5 |
| 0.160–0.1799 | n | 3.5 | — | 5.5 | 11.5 | — | | 8.5 | 6.5 | 5.5 | 3.5 | 2.5 |

TABLE 25

Symbol X1060 Tag Read Distance, dB attenuation
Isolator: k2/A
k = 2 Layer Thickness/Total Isolator thickness, %

| Total Thickness | 0% | 1–9.9% | 10–19.9% | 20–29.9% | 30–39.9% | 40–49.9% | 50–59.9% | 60–69.9% | 70–79.9% | 80–89.9% | 90–99.9% | 100% |
|---|---|---|---|---|---|---|---|---|---|---|---|---|
| 0.040–0.0599 | n | | | | | | | | | | | n |
| 0.060–0.0799 | n | | | | | | 3.5 | 5.0, 6.5 | 4.5 | | | n |
| 0.080–0.0999 | n | | | | | | 5.5, 6.5 | 6.5 | 4.5, 7.5 | | | n |
| 0.100–0.1199 | n | | | | 3.5 | 5.5 | 6.5 | 6.5 | 8.5, 8.5 | 6.5 | | n |
| 0.120–0.1399 | n | | | | 3.5 | — | 7.5 | 8.5, 9.5 | | 7.5, 9.5 | | n |
| 0.140–0.1599 | — | | | | | 7.5 | 8.0 | 10.5 | 10.0, 10.5 | | | 1.5 |
| 0.160–0.1799 | | | | | | 8.5 | | 9.5 | | | | 2.5 |

Tables 26, 27 and 28 compare three two-layer isolators wherein the metal side is composed of electromagnetic material, formulation A, and the tag side is either k2 (Table 26), k4 (Table 27) or k10 (Table 28) dielectric material. The tag is an Alien "M" tag. The electromagnetic material, formulation A, provides isolation as a single layer to this tag, as in the case of Formulation B, shown above in Table 23. However, in this case, the read distance is significantly improved. The isolator is moderately effective at thickness as small as 0.040–0.0599 inches and is significantly more effective at 0.100–0.1199 inches thick.

TABLE 26

Alien "M" Tag Read Distance, dB attenuation
Isolator: k2/A
k = 2 Layer Thickness/Total Isolator thickness, %

| Total Thickness | 0% | 1–9.9% | 10–19.9% | 20–29.9% | 30–39.9% | 40–49.9% | 50–59.9% | 60–69.9% | 70–79.9% | 80–89.9% | 90–99.9% | 100% |
|---|---|---|---|---|---|---|---|---|---|---|---|---|
| 0.040–0.0599 | 2.5, 3.5 | | | | | | | | | | | n |
| 0.060–0.0799 | 2.5 | | | | | | | n | | | | n |

TABLE 26-continued

Alien "M" Tag Read Distance, dB attenuation
Isolator: k2/A
k = 2 Layer Thickness/Total Isolator thickness, %

| Total Thickness | 0% | 1–9.9% | 10–19.9% | 20–29.9% | 30–39.9% | 40–49.9% | 50–59.9% | 60–69.9% | 70–79.9% | 80–89.9% | 90–99.9% | 100% |
|---|---|---|---|---|---|---|---|---|---|---|---|---|
| 0.080–0.0999 | 3.0 |  | 4.5, 5.5 |  |  |  |  |  |  |  |  | n |
| 0.100–0.1199 | 6.5 | 7.5 |  |  | n |  |  | n |  |  |  | n |

TABLE 27

Alien "M" Tag Read Distance, dB attenuation
Isolator: k4/A
k = 4 Layer Thickness/Total Isolator thickness, %

| Total thickness | 0% | 1–9.9% | 10–19.9% | 20–29.9% | 30–39.9% | 40–49.9% | 50–59.9% | 60–69.9% | 70–79.9% | 80–89.9% | 90–99.9% | 100% |
|---|---|---|---|---|---|---|---|---|---|---|---|---|
| 0.040–0.0599 | 2.5, 3.5 |  | n, 2.5 | n |  |  |  |  |  |  |  | n |
| 0.060–0.0799 | 2.5 |  | 4.5, 6.5 | 0.5, 1.0 | n, n | n |  | n |  |  |  | n |
| 0.080–0.0999 | 3.0 | 7.5 | 6.5 | 4.5 |  |  |  |  |  | n | n | n |
| 0.100–0.1199 | 6.5 |  | 6.5 |  |  |  |  |  |  |  |  | 2.0 |

TABLE 28

Alien "M" Tag Read Distance, dB attenuation
Isolator: k10/A
k = 10 Layer Thickness/Total Isolator thickness, %

| Total thickness | 0% | 1–9.9% | 10–19.9% | 20–29.9% | 30–39.9% | 40–49.9% | 50–59.9% | 60–69.9% | 70–79.9% | 80–89.9% | 90–99.9% | 100% |
|---|---|---|---|---|---|---|---|---|---|---|---|---|
| 0.040–0.0599 | 2.5, 3.5 |  |  |  |  |  |  |  |  |  |  | n |
| 0.060–0.0799 | 2.5 |  |  |  | n |  | n |  |  |  |  | n |
| 0.080–0.0999 | 3.0 |  | 5.5 | 5.5 |  |  |  |  |  |  |  | n |
| 0.100–0.1199 | 6.5 |  |  | 7.5 | 7.5 | 8.5 |  |  |  |  |  | n |

These tables further demonstrate the interdependence of electromagnetic properties, total thickness and proportions of material in the gradient in matching the tag antenna requirements. Two additional comparisons were done; Tables 29 and 30 show the results of combining k=4 dielectric material with Formulations A and B. Tables 31 and 32 show the results of combining k=10 dielectric material with Formulations A and C.

TABLE 29

Alien "M" Tag Read Distance, dB attenuation
Isolator: k4/A
k = 4 Layer Thickness/Total Isolator thickness, %

| Total Thickness | 0% | 1–9.9% | 10–19.9% | 20–29.9% | 30–39.9% | 40–49.9% | 50–59.9% | 60–69.9% | 70–79.9% | 80–89.9% | 90–99.9% | 100% |
|---|---|---|---|---|---|---|---|---|---|---|---|---|
| 0.040–0.0599 | 2.5, 3.5 |  | n, 2.5 | n |  |  |  |  |  |  |  | n |
| 0.060–0.0799 | 2.5 |  | 4.5, 6.5 | 0.5, 1.0 | n, n | n |  | n |  |  |  | n |
| 0.080–0.0999 | 3.0 | 7.5 | 6.5 | 4.5 |  |  |  |  |  | n | n | n |
| 0.100–0.1199 | 6.5 |  | 6.5 |  |  |  |  |  |  |  |  | 2.0 |

TABLE 30

Alien "M" Tag Read Distance, dB attenuation
Isolator: k4/B
k = 4 Layer Thickness/Total Isolator thickness, %

| Total Thickness | 0% | 1–9.9% | 10–19.9% | 20–29.9% | 30–39.9% | 40–49.9% | 50–59.9% | 60–69.9% | 70–79.9% | 80–89.9% | 90–99.9% | 100% |
|---|---|---|---|---|---|---|---|---|---|---|---|---|
| 0.040–0.0599 | n, n |  |  |  |  | 2.5 |  |  |  |  |  | n |
| 0.060–0.0799 | n, n |  |  |  | 5.5 | 4.5, 4.5 | 2.5 | 0.5 |  |  |  | n |
| 0.080–0.0999 | n |  | n | 2.5, 5.0 | 4.5, 6.5 | 6.5, 6.5 | 3.5 | 1 | n |  |  | n |
| 0.100–0.1199 | n |  |  |  | 6 | 7.5, 7.5 |  |  |  |  |  | 2.0 |

TABLE 31

Alien "M" Tag Read Distance, dB attenuation
Isolator: k10/A
k = 10 Layer Thickness/Total Isolator thickness, %

| Total Thickness | 0% | 1–9.9% | 10–19.9% | 20–29.9% | 30–39.9% | 40–49.9% | 50–59.9% | 60–69.9% | 70–79.9% | 80–89.9% | 90–99.9% | 100% |
|---|---|---|---|---|---|---|---|---|---|---|---|---|
| 0.040–0.0599 | 2.5, 3.5 |  |  |  |  |  |  |  |  |  |  | n |
| 0.060–0.0799 | 2.5 |  |  |  | n |  | n |  |  |  |  | n |
| 0.080–0.0999 | 3.0 |  | 5.5 | 5.5 |  |  |  |  |  |  |  | n |
| 0.100–0.1199 | 6.5 |  |  | 7.5 | 7.5 | 8.5 |  |  |  |  |  | n |

TABLE 32

Alien "M" Tag Read Distance, dB attenuation
Isolator: k10/C
k = 10 Layer Thickness/Total Isolator thickness, %

| Total Thickness | 0% | 1–9.9% | 10–19.9% | 20–29.9% | 30–39.9% | 40–49.9% | 50–59.9% | 60–69.9% | 70–79.9% | 80–89.9% | 90–99.9% | 100% |
|---|---|---|---|---|---|---|---|---|---|---|---|---|
| 0.040–0.0599 | n, n, n, n |  |  |  |  |  |  |  |  |  |  | n |
| 0.060–0.0799 | n, n |  |  | n | n |  |  |  |  |  |  | n |
| 0.080–0.0999 | n |  | n |  |  | n |  |  |  |  |  | n |
| 0.100–0.1199 | n |  |  |  |  | n |  |  |  |  |  | n |

Tables 26 through 32 in concert demonstrate the balancing of parameters required for effective isolation of the tag as different isolator electromagnetic parameters are selected. When the tag side dielectric constant is very low, i.e. k=2–4, gradients were superior to the homogeneous electromagnetic isolator at low isolator total thickness. The locus of effective gradient isolator performance occurred when the tag side dielectric layer was 1–30% of the total isolator thickness. Increasing the tag side dielectric constant to k=10 again demonstrated effective gradient isolators, but the locus of effectiveness shifted to 10–50% of the total isolator thickness being the k=10 tag side layer.

The rebalancing to match antenna requirements is not limited to adjustments on the tag side gradient layer only. Table 29 represents isolator k4/A, while Table 30 represents a k4/B isolator. When the metal side gradient layer changed from electromagnetic material A to material B, which results in an increase in permittivity and permeability, the locus of effective isolator performance shifted from tag side dielectric layer proportion of 1–30% to 20–50%.

The criticality of balancing isolator parameters is demonstrated by Table 31, where isolator k10/A, is compared with Table 32, which has a k10/C isolator. As the metal side gradient layer permittivity and permeability are increased to the level of electromagnetic material C, the ability to isolate the Alien "M" tag is lost. Without careful investigation over a range of electromagnetic material properties, it may be erroneously concluded gradient isolators do not perform.

It was found the Symbol Technologies Trident tag was read with lower read rate by the current ThingMagic4 software provided with the reader. The effect of this can be observed in the free space and air gap read distance graph, FIG. 4b. The maximum read rate in free space was only about 10%. With a metal substrate, the tag could not be read until air gap standoff was 0.4–0.5 inches. However, at 0.5-inch air gap standoff the read rate was 30%, higher than achieved in free space. Based on these findings, a read rate of 25% was established as the critical value for judging a successful read of this tag at any given power attenuation, as opposed to the 75% value adopted for all other tag tests.

Tables 33 and 34 show the effective isolation of this tag by k2/C and k4/C electromagnetic gradient isolators, respectively. Homogeneous single layer isolators of either dielectric material or electromagnetic material both provided moderate isolation. However, dielectric-electromagnetic gradient isolators provided significantly greater read range performance. Further, read range was significantly superior to air gap standoff performance.

TABLE 33

Symbol Trident Tag Read Distance, dB attenuation
Isolator: k2/C
k = 2 Layer Thickness/Total Isolator thickness, %

| Total Thickness | 0% | 1–9.9% | 10–19.9% | 20–29.9% | 30–39.9% | 40–49.9% | 50–59.9% | 60–69.9% | 70–79.9% | 80–89.9% | 90–99.9% | 100% |
|---|---|---|---|---|---|---|---|---|---|---|---|---|
| 0.040–0.0599 | n, n, n, n | | | | | | | | | | | 1.0 |
| 0.060–0.0799 | n, n | | | | | n | | n, n | n | | | 1.0 |
| 0.080–0.0999 | 3.0 | | | | n | | | n | n | n, 2.0 | | 2.0 |
| 0.100–0.1199 | 3.0 | | | | | 7.0 | 7.0 | 4.0 | n, n | | | 2.0 |
| 0.120–0.1399 | 4.0 | | | | | | 8.0, 8.0 | | | | | 1.0 |

TABLE 34

Symbol Trident Tag Read Distance, dB attenuation
Isolator: k4/C
k = 4 Layer Thickness/Total Isolator thickness, %

| Total Thickness | 0% | 1–9.9% | 10–19.9% | 20–29.9% | 30–39.9% | 40–49.9% | 50–59.9% | 60–69.9% | 70–79.9% | 80–89.9% | 90–99.9% | 100% |
|---|---|---|---|---|---|---|---|---|---|---|---|---|
| 0.040–0.0599 | n, n, n, n | | n, n, n | n, n | n, n | n, n, 4.0 | n | n | n | | | n |
| 0.060–0.0799 | n, n | | n, n, n, n, 3.5 | n, 2.0, 6.0 | n, 0.0, 6.0, 7.0 | 5.0, 6.0, 7.0 | n, 5.0 | n, 5.0 | n | | | 3.0 |
| 0.080–0.0999 | 3.0 | | n | n, n, 6.0 | 6.0, 6.0, 7.0, 7.0 | 3.0, 7.0 | n, n | n | | | | 2.0 |
| 0.100–0.1199 | 3.0 | | | | 8.0 | 6.0, 6.0, 6.0 | | | | | | 3.0 |
| 0.120–0.1399 | 4.0 | | | | | | | | | | | |

The Applied Wireless Identifications APL-1216 tag, FIG. 5, was not readable with the test chamber utilized for read range performance testing. The possible reason is the minimum read range of the test chamber is approximately 3 feet and the free space read range of the tag is less than that distance. Ignoring this finding, electromagnetic isolators were tested for effectiveness. Surprisingly, isolator parameters were discovered which provided moderate read distance for this tag, as shown in Table 35. Selection of appropriate isolator parameters actually enhanced the read range performance of the tag in this testing.

In addition to improved isolators comprised of electromagnetic composite materials as a single layer or in gradient isolators with dielectric composite materials, gradient electromagnetic isolators may be utilized. Further electromagnetic isolator material was prepared by blending ferromagnetic carbonyl iron, nickel-zinc ferrite or magnetite with silicone elastomer prepolymer and a curing agent, casting a sheet, and curing the cast sheet either at room temperature or elevated temperature, as appropriate to the formulation. The measured electromagnetic properties of these isolator formulations at 915 MHz are given in Table 36.

TABLE 35

AWID APL-1216 Tag Read Distance, dB attenuation
Isolator: k10/A
k = 10 Layer Thickness/Total Isolator thickness, %

| Total Thickness | 0% | 1–9.9% | 10–19.9% | 20–29.9% | 30–39.9% | 40–49.9% | 50–59.9% | 60–69.9% | 70–79.9% | 80–89.9% | 90–99.9% | 100% |
|---|---|---|---|---|---|---|---|---|---|---|---|---|
| 0.040–0.0599 | n | | | | | n | | | | | | n |
| 0.060–0.0799 | n | | | | | | | n | | | | n |
| 0.080–0.0999 | n | | | | | n | n, n, 3.5 | | | | | n |
| 0.100–0.1199 | n | | | n | | 3.5 | 3.5 | n, 3.5 | | | | n |

TABLE 36

ELECTROMAGNETIC MATERIAL PROPERTIES

| Formulation | Electromagnetic Filler | Permittivity, $\epsilon$ | Permeability, $\mu$ |
|---|---|---|---|
| D | carbonyl iron | 5.2 − j0.07 | 1.5 − j0.1 |
| E | nickel-zinc ferrite | 4.6 − j0.07 | 1.7 − j0.3 |
| F | magnetite | 6.3 − j0.1 | 1.5 − j0.1 |

Two-layer isolators utilizing each of the materials in Table 36 as the tag side layer and formulation A as the metal side layer were interposed between an Alien M tag and a metal substrate and read distance was measured. Results are given in Table 37.

TABLE 37

Alien "M" Tag Read Distance, dB attenuation
Isolator Thickness: 0.100–0.1199 inches
Tag Side Layer Thickness/Total Isolator thickness, %

| Isolator | 0% | 1–9.9% | 10–19.9% | 20–29.9% | 30–39.9% | 40–49.9% | 50–59.9% | 60–69.9% | 70–79.9% | 80–89.9% | 90–99.9% | 100% |
|---|---|---|---|---|---|---|---|---|---|---|---|---|
| D/A | 6.5 | 7.5 | — | 7.5 | 5.5 | 7.5 | 3.0 | 2.0 | 0.0 | n | | n |
| E/A | 6.5 | | 7.5 | 7.0 | 5.5 | 5.5 | 3.0 | 2.5 | 2.5 | 0.5 | | n |
| F/A | 6.5 | 7.5 | — | 6.5 | 6.5 | 5.5 | 4.0 | 3.0 | 2.5 | n | | n |

For this tag, a gradient electromagnetic isolator wherein the tag side permeability is less than the metal side permeability provided some improvement in read distance when the tag side layer proportion was between 1–20% of the total isolator thickness.

A multitude of RFID tag designs from many manufacturers currently exist in the marketplace and the list is expanding as RFID interest increases. As is clear from the tables herein, each tag requires an isolator uniquely formulated to match the impedance requirements necessary to isolate it from the interfering substrate. This applies not only to tags from different manufacturers, but also to the various tag designs from a given manufacturer. For example, a Symbol X1060 tag could be read utilizing a k2/A isolator, as shown in Table 25, whereas a Symbol Trident tag was not readable with this isolator profile, but was readable utilizing a k4/C isolator, as shown in Table 34. As the antenna designs are proprietary to each manufacturer and no industry standard design exists, identifying an isolator suitable for a given RFID tag is not possible a priori. The following experimental strategy can provide the appropriate isolator selection.

It can be seen in most of the above graphs that the combination showing the best performance are not scattered. Rather, there are "clusters" of optimal operation. These clusters typically have similar thicknesses and ratios of low dielectric material to higher dielectric material. This phenomenon can be exploited in developing a strategy that provides the appropriate isolator combination.

Determining the desired isolator information is a two-step process; firstly determining the subset of potential isolator formulations that can serve to isolate a given tag design, then selecting the formulation which best meets the tag's specified usage. A screening experiment, locating a region on a grid of relative proportions of the various dielectric and/or electromagnetic components of the total isolator thickness versus total isolator thickness in the manner of the read distance tables herein is firstly required. A two-layer isolator series is prepared, wherein the tag-side layer consists of a low loss, low dielectric material whose dielectric constant is 2–4 and the article-side layer consists of either a higher dielectric constant material, k=20–30, or an electromagnetic material whose permeability is 5–10. An electromagnetic article-side layer is preferred initially. Isolators are fabricated with a total thickness of 0.120–0.0–140 inches and a tag-side proportion of the total thickness ranging from 0% to 100% in approximately 10% increments. Read distance tests are conducted with this series of isolators. Other initial screening series may of course be utilized should there be other restrictions or specifications placed on the selection of acceptable isolators. The critical element is that there be a wide enough screening of formulations such that discovery of candidate formulation(s) is relatively likely.

If at least one isolator(s) formulation is discovered that provides sufficient isolation of the tag to allow readability, the experimental task then becomes one of determining the formulation that satisfies the market need. This market need can involve such considerations as minimum read distance, thinnest isolator that can meet a given read distance, lowest cost isolator, or any other market criteria. Final isolator formulation thus involves detailed examination of the region of tag readability discovered in the first screening experiment by any suitable search procedure for the appropriate formulation that best meets the market need.

If no isolator(s) formulation is discovered that allows tag readability, the next most fruitful screen is to increase the total thickness of the isolator and conduct another series of experiments with isolators fabricated with the tag-side layer again ranging from 0% to 100% of the total isolator. While any isolator thickness may be selected it is preferable the thickness be at least 0.240–0.0260 inches, provided the air gap read distance for the RFID tag is greater than this thickness. The second screening thickness must be less than the tag's air gap read distance to avoid false conclusions about isolator efficacy. If a region of formulation(s) is discovered that allow readability, determining the best formulation available to meet market need follows as described in the preceding paragraph.

Should no viable isolator formulations yet be discovered, changing dielectric and/or electromagnetic properties of isolator layers is next. It has generally been found to be more fruitful to alter the properties of the article-side composition firstly both increasing and decreasing dielectric/electromagnetic properties. Screening with a series of proportions as before and the same greater thickness as the second screening is preferable. Success can be limited by the range of dielectric and/or electromechanical properties that can be achieved with the raw materials available to the formulator as there are perhaps an infinite variety of antenna designs possible, but only a finite range of dielectric and electromagnetic raw materials.

The above strategy assumed the pre-existence of an antenna design, and generated a process to determine the optimal isolator combination for use with that antenna. However, alternatively, the isolator combination may be selected first based on cost, thickness, or other factors. In this case, subsequent efforts would then be directed toward the creation of an appropriate antenna design for use with that particular isolator.

What is claimed is:

1. An identification system, adapted to transmit identifying information about an article via radio frequency, comprising:
an RFID tag, adapted to transmit said identifying information via radio frequency when energized;
a first layer having first and second opposite surfaces and a first dielectric constant, wherein said first surface is adapted to be in contact with said article;
a second layer having first and second opposite surfaces and a second dielectric constant, wherein said second surface of said second layer is in contact with said RFID tag, wherein said first and said second dielectric constants are unequal.

2. The system of claim 1, wherein said first dielectric constant is greater than said second dielectric constant.

3. The system of claim 1, wherein said first layer comprises titanium dioxide.

4. The system of claim 1, wherein said second layer comprises titanium dioxide.

5. The system of claim 1, wherein said first surface of said second layer is in contact with a second surface of said first layer.

6. The system of claim 1, wherein said first layer has permeability greater than one.

7. The system of claim 1, wherein said first dielectric constant is from about 9 to about 30.

8. The system of claim 1, wherein said second dielectric constant is from about 2 to about 10.

9. The system of claim 1, further comprising a third layer, having a third dielectric constant whose value is greater than said second dielectric constant and less than said first dielectric constant, wherein said third layer is interposed between said second surface of said first layer and said first surface of said second layer.

10. An identification system, adapted to transmit identifying information about an article via radio frequency, comprising:
an RFID tag, adapted to transmit said identifying information via radio frequency when energized;
and a first layer having first and second opposite surfaces, a dielectric constant, and a magnetic permeability greater than 1, wherein said first layer is interposed between said article and said RFID tag.

11. The system of claim 10, wherein said first layer is comprised of carbonyl iron, nickel-zinc ferrite or magnetite.

12. The system of claim 10, wherein said magnetic permeability is from about 1.5 to about 7.

13. The system of claim 10, wherein said dielectric constant is from about 4 to about 32.

14. The system of claim 10, wherein said first surface of said first layer is in contact with said article and said second surface of said first layer is in contact with said RFID tag.

15. The system of claim 10, further comprising a second layer having first and second opposite surfaces, interposed between said first layer and said RFID tag.

16. The system of claim 15, wherein said second layer has a dielectric constant from about 1.5 to about 10.

17. The system of claim 15, wherein said second layer has a magnetic permeability greater than 1.

18. The system of claim 17, wherein said second layer has a magnetic permeability less than the permeability of said first layer.

19. The system of claim 15, wherein said first surface of said first layer is in contact with said article, said second surface of said first layer is in contact with said first surface of said second layer and said second surface of said second layer is in contact with said RFID tag.

20. An identification system, adapted to transmit identifying information about an article via radio frequency, comprising:
an RFID tag, adapted to transmit said identifying information via radio frequency when energized; and
a layer, having a first surface adapted to be in contact with said article, and a second opposite surface in contact with said RFID tag, wherein said layer has a dielectric constant gradient between said first surface and said second surface.

21. The system of claim 20, wherein said dielectric constant at said first surface is greater than the dielectric constant at said second surface.

22. A radio frequency identification system, adapted to transmit identifying information about an article comprising;
a substrate comprising an integrated circuit containing said identifying information and an antenna adapted to transmit said identifying information;
a first layer, having first and second opposite surfaces and a first dielectric constant, wherein said first surface is adapted to be in contact with said article; and
a second layer, having first and second opposite surfaces and a second dielectric constant, wherein said second surface of said second layer is in contact with said substrate and said first and second dielectric constants are unequal.

23. The system of claim 22, wherein said first dielectric constant is greater than said second dielectric constant.

24. The system of claim 22, wherein said first layer comprises titanium dioxide.

25. The system of claim 22, wherein said second layer comprises titanium dioxide.

26. The system of claim 22, wherein said first surface of said second layer is in contact with a second surface of said first layer.

27. The system of claim 22, wherein said first layer has permeability greater than one.

28. The system of claim 22, wherein said first dielectric constant is from about 9 to about 30.

29. The system of claim 22, wherein said second dielectric constant is from about 2 to about 10.

30. The system of claim 22, further comprising a third layer, having a third dielectric constant whose value is greater than said second dielectric constant and less than said first dielectric constant, wherein said third layer is interposed between said second surface of said first layer and said first surface of said second layer.

31. The system of claim 22, wherein said substrate further comprises a first surface upon which said integrated circuit and said antenna are located and a second surface in contact with said second surface of said second layer.

32. A radio frequency identification system, adapted to transmit identifying information about an article comprising;
- a substrate comprising an integrated circuit containing said identifying information and an antenna adapted to transmit said identifying information;
- and a first layer, having first and second opposite surfaces, a dielectric constant, and a magnetic permeability greater than 1, wherein said first layer is interposed between said article and said RFID tag.

33. The system of claim 32, wherein said first layer is comprised of carbonyl iron, nickel-zinc ferrite or magnetite.

34. The system of claim 32, wherein said magnetic permeability is from about 1.5 to about 7.

35. The system of claim 32, wherein said dielectric constant is from about 4 to about 32.

36. The system of claim 32, wherein said first surface of said first layer is in contact with said article and said second surface of said first layer is in contact with said RFID tag.

37. The system of claim 32, further comprising a second layer having first and second opposite surfaces, interposed between said first layer and said substrate.

38. The system of claim 37, wherein said second layer has a dielectric constant from about 1.5 to about 10.

39. The system of claim 37, wherein said second layer has a magnetic permeability greater than 1.

40. The system of claim 39, wherein said second layer has a magnetic permeability less than the permeability of said first layer.

41. The system of claim 37, wherein said first surface of said first layer is in contact with said article, said second surface of said first layer is in contact with said first surface of said second layer and said second surface of said second layer is in contact with said substrate.

42. A radio frequency identification system, adapted to transmit identifying information about an article comprising;
- a substrate comprising an integrated circuit containing said identifying information and an antenna adapted to transmit said identifying information; and
- a layer, having first and second opposite surfaces interposed between said substrate and said article adapted to be in contact with said article, wherein said layer has a dielectric constant gradient between said first surface and said second surface.

43. The system of claim 42, wherein the dielectric constant at said first surface is greater than the dielectric constant at said second surface.

44. The system of claim 42, wherein said substrate further comprises a first surface upon which said integrated circuit and said antenna are located and a second surface in contact with said second surface of said layer.

45. A device, comprising:
- an article having a surface;
- a first layer in contact with said surface of said article, having first and second opposite surfaces and having a first dielectric constant;
- a second layer having first and second opposite surfaces and having a second dielectric constant different from said first dielectric constant; and
- an RFID tag in contact with said second layer, said RFID tag adapted to transmit identifying information about said article via radio frequency when energized.

46. The device of claim 45, wherein said first dielectric constant is greater than said second dielectric constant.

47. The device of claim 45, wherein said first layer comprises titanium dioxide.

48. The device of claim 45, wherein said second layer comprises titanium dioxide.

49. The device of claim 45, wherein said first surface of said second layer is in contact with a second surface of said first layer.

50. The device of claim 45, wherein said first layer has permeability greater than one.

51. The device of claim 45, wherein said first dielectric constant is from about 9 to about 30.

52. The device of claim 45, wherein said second dielectric constant is from about 2 to about 10.

53. The device of claim 45, further comprising a third layer, having a third dielectric constant whose value is greater than said second dielectric constant and less than said first dielectric constant, wherein said third layer is interposed between said second surface of said first layer and said first surface of said second layer.

54. The device of claim 45, wherein said substrate further comprises a first surface upon which said integrated circuit and said antenna are located and a second surface in contact with said second surface of said second layer.

55. The device of claim 45, wherein said surface of said article comprises metal.

56. The device of claim 45, wherein said article contains liquid.

57. A device, comprising:
- an article having a surface;
- an RFID tag adapted to transmit identifying information about said article via radio frequency when energized; and
- a first layer having first and second opposite surfaces, a dielectric constant and a magnetic permeability greater than 1, wherein said first layer is interposed between said article and said RFID tag.

58. The device of claim 57, wherein said first layer is comprised of carbonyl iron, nickel-zinc ferrite or magnetite.

59. The device of claim 57, wherein said magnetic permeability is from about 1.5 to about 7.

60. The device of claim 57, wherein said dielectric constant is from about 4 to about 32.

61. The device of claim 57, wherein said first surface of said first layer is in contact with said article and said second surface of said first layer is in contact with said RFID tag.

62. The device of claim 57, further comprising a second layer having first and second opposite surfaces, interposed between said first layer and said RFID tag.

63. The device of claim 62, wherein said second layer has a dielectric constant from about 1.5 to about 10.

64. The device of claim 62, wherein said second layer has a magnetic permeability greater than 1.

65. The device of claim 64, wherein said second layer has a magnetic permeability less than the permeability of said first layer.

66. The device of claim 62, wherein said first surface of said first layer is in contact with said article, said second surface of said first layer is in contact with said first surface of said second layer and said second surface of said second layer is in contact with said RFID tag.

67. The device of claim 57, wherein said surface of said article comprises metal.

68. The device of claim 57, wherein said article contains liquid.

69. A device, comprising:
an article having a surface;
a first layer in contact with said surface of said article, having first and second opposite surfaces;
an RFID tag in contact with said layer, said RFID tag adapted to transmit identifying information about said article via radio frequency when energized;
wherein said layer has a dielectric gradient such that the dielectric constant at the interface of said layer and said surface is different from the dielectric constant at the interface of said layer and said RFID tag.

70. The device of claim 69, wherein said dielectric at the interface of said layer and said surface is greater than the dielectric constant at the interface of said layer and said RFID tag.

71. The device of claim 69, wherein said surface of said article comprises metal.

72. The device of claim 69, wherein said article contains liquid.

* * * * *